US012695529B2

(12) United States Patent
Zinner

(10) Patent No.: US 12,695,529 B2
(45) Date of Patent: Jul. 28, 2026

(54) METHOD FOR ASCERTAINING THE CONTROL UNIT TEMPERATURE BY MEANS OF A TIME SYNCHRONIZATION PROTOCOL

(71) Applicant: Continental Automotive Technologies GmbH, Hannover (DE)

(72) Inventor: Helge Zinner, Frankfurt am Main (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 496 days.

(21) Appl. No.: 18/037,667

(22) PCT Filed: Nov. 30, 2021

(86) PCT No.: PCT/DE2021/200225
§ 371 (c)(1),
(2) Date: Oct. 5, 2023

(87) PCT Pub. No.: WO2022/117166
PCT Pub. Date: Jun. 9, 2022

(65) Prior Publication Data
US 2024/0388373 A1 Nov. 21, 2024

(30) Foreign Application Priority Data
Dec. 2, 2020 (DE) ..................... 10 2020 215 247.0

(51) Int. Cl.
*H04J 3/06* (2006.01)
*B60R 16/023* (2006.01)
*H04L 43/0852* (2022.01)

(52) U.S. Cl.
CPC .......... *H04J 3/0667* (2013.01); *B60R 16/023* (2013.01); *H04L 43/0852* (2013.01)

(58) Field of Classification Search
CPC ... H04J 3/0667; B60R 16/023; H04L 43/0852
See application file for complete search history.

(56) References Cited

U.S. PATENT DOCUMENTS

| | | | |
|---|---|---|---|
| 8,744,028 B2 | 6/2014 | Yanagidate | |
| 9,590,802 B2 | 3/2017 | Torimoto et al. | |

(Continued)

FOREIGN PATENT DOCUMENTS

| | | |
|---|---|---|
| CN | 111264039 A | 6/2020 |
| DE | 102015206085 A1 | 10/2016 |

(Continued)

OTHER PUBLICATIONS

Office Action (Notice to Submit Response) issued Jul. 14, 2025, by the Korean Intellectual Property Office in corresponding Korean Patent Application No. 10-2023-7016102 and an English translation of the Office Action (6 pages).

(Continued)

*Primary Examiner* — Chandrahas B Patel
(74) *Attorney, Agent, or Firm* — Buchanan Ingersoll & Rooney PC

(57) ABSTRACT

The invention relates to a method for determining the control unit temperature in a motor vehicle by means of Ethernet, comprising the steps of: determining a transit time of a first signal on a first connection path between a first server ECU of the Ethernet vehicle electrical system and a second server ECU of the Ethernet vehicle electrical system; determining a maximum speed of the first connection path on the basis of the transit time; identifying at least a first server ECU of the Ethernet vehicle electrical system; syn-chronising at least a first server ECU of the Ethernet vehicle electrical system; determining the synchronisation interval; determining a timestamp of the first server ECU; reading a timestamp or querying the clock time of the first server ECU; comparing the timestamp with a reference clock of the (Continued)

Ethernet vehicle electrical system; carrying out a transit time measurement; determining the speed of the associated clock generator; determining the time difference of the synchronisation interval; determining the last synchronisation.

18 Claims, 23 Drawing Sheets

(56) References Cited

U.S. PATENT DOCUMENTS

| | | | | |
|---|---|---|---|---|
| 10,771,346 | B2 | 9/2020 | Joos et al. | |
| 11,251,891 | B2 | 2/2022 | Zinner | |
| 11,522,778 | B2 | 12/2022 | Meier et al. | |
| 11,665,518 | B2 | 5/2023 | Zinner et al. | |
| 12,162,415 | B2 * | 12/2024 | Kurokawa | H04L 12/40 |
| 2014/0130596 | A1 * | 5/2014 | Nakamura | G01P 3/42 |
| | | | | 73/504.12 |
| 2015/0098476 | A1 | 4/2015 | Reese et al. | |
| 2016/0127118 | A1 | 5/2016 | Yun et al. | |
| 2016/0285462 | A1 | 9/2016 | Takamuku et al. | |
| 2019/0205272 | A1 | 7/2019 | Fodor et al. | |
| 2019/0356466 | A1 | 11/2019 | Kratz et al. | |
| 2020/0056946 | A1 | 2/2020 | Chen | |
| 2020/0295861 | A1 | 9/2020 | Zinner | |

FOREIGN PATENT DOCUMENTS

| | | | |
|---|---|---|---|
| DE | 102016219663 | A1 | 4/2018 |
| DE | 102017219209 | A1 | 5/2019 |
| EP | 2575258 | B1 | 8/2014 |
| JP | 2010-206373 | A | 9/2010 |
| JP | 2018-146393 | A | 9/2018 |
| JP | 2020-518796 | A | 6/2020 |
| JP | 2020-188401 | A | 11/2020 |
| WO | 2012/147156 | A1 | 11/2012 |
| WO | 2014111920 | A1 | 7/2014 |
| WO | 2016170007 | A1 | 10/2016 |
| WO | 2019/081463 | A1 | 5/2019 |
| WO | 2019/197233 | A1 | 10/2019 |
| WO | 2019/219316 | A1 | 11/2019 |
| WO | 2020/020932 | A1 | 1/2020 |

OTHER PUBLICATIONS

Lim, H.T. et al., "IEEE 802.1AS Time Synchronization in a Switched Ethernet based In-Car Network", Vehicle Networking Conference (VNC), 2011 IEEE, IEEE, Nov. 14, 2011, pp. 147-154, XP032081880.

Kern, A., et al., "Accuracy of Ethernet AVB Time Synchronization under Varying Temperature Conditions for Automotive Networks", Design Automation Conference (DAC), 2011 48th ACM/EDAC/IEEE, IEEE, Jun. 5, 2011, pp. 597-602, XP031927788.

"Audio Video Bridging Task Group", IEEE 802.1 AV Bridging Task Group, Mar. 20, 2013, 3 pages.

"IEEE802 P802.1AS-Rev—Timing and Synchronization for Time-Sensitive Applications", Aug. 2018, 12 pages.

"Automotive Ethernet AVB Functional and Interoperability Specification", Revision 1.4, May 12, 2015, 54 pages.

International Search Report and Written Opinion for International Application No. PCT/DE2021/200225, mailed Mar. 28, 2022, 10 pages.

International Search Report and Written Opinion for International Application No. PCT/DE2021/200225, mailed Mar. 28, 2022, 16 pages (German).

German Search Report for German Application No. 10 2020 215 247.0, dated Aug. 23, 2021 with translation, 8 pages.

Office Action (Notice of Reasons for Refusal) issued Jun. 25, 2024, by the Japan Patent Office in corresponding Japanese Patent Application No. 2023-533681 and an English translation of the Office Action. (10 pages).

Hu et al., "Next-Generation Automotive Networks: Current Status and Development of In-Vehicle Ethernet Technology", Computer Engineering and Applications, (Dec. 15, 2016), vol. 52, No. 4, pp. 29-36 with an English Abstract.

Wang et al., "A method of temperature drift compensation for pulse synchronization in high-speed signal acquisition," 2017 3rd IEEE International Conference on Control Science and Systems Engineering (ICCSSE), (Oct. 30, 2017), pp. 529-534.

Office Action (The First Office Action) issued Mar. 24, 2026, by the State Intellectual Property Office of People's Republic of China in corresponding Chinese Patent Application No. 202180078772.5 and an English translation of the Office Action. (16 pages).

* cited by examiner

Synchronization interval
Clock generator speed

602

604

Calculate the maximum deviation

Ascertain the time of the last successful synchronization

Sensor fusion t2 t2n

Pdelay_request (t1)

(t1n)

Sensor t1 t1n

702 Start the delay measurement

704 Transmit link measurement messages

706 Receive synchronization messages

708 Determine the delay to the link partner

710 Store the current value

Cyclically repeating

1001 — Receive an encrypted message

1002 — Optional: start measurement of the line delay and frequency measurement

1003 — Request the last line measurement and frequency parameters

1004 — Generate the key

1005 — Decrypt the message

METHOD FOR ASCERTAINING THE CONTROL UNIT TEMPERATURE BY MEANS OF A TIME SYNCHRONIZATION PROTOCOL

CROSS REFERENCE TO RELATED APPLICATIONS

This application is the U.S. National Phase Application of PCT International Application No. PCT/DE2021/200225, filed Nov. 30, 2021, which claims priority to German Patent Application No. 10 2020 215 247.0, filed Dec. 2, 2020, the contents of such applications being incorporated by reference herein.

FIELD OF THE INVENTION

The present invention relates to a method for ascertaining the control unit temperature by means of a time synchronization protocol.

BACKGROUND OF THE INVENTION

Ethernet technologies are used increasingly in vehicles and replace older or proprietary data connections and data buses therein. Ethernet connections support a multiplicity of network protocols on layer 3 of the OSI layer model for transmitting data packets between transmitters and receivers. On the higher protocol layers, the segmentation of the data stream into packets, the process communication between systems that communicate with one another, the translation of data into a system-independent form and finally the provision of functions for applications take place.

The next form of E/E architecture, so-called "zone oriented architecture" and "server-based architecture", is currently being developed. The difference with respect to a present-day architecture is that control units are positioned at specific geo-positions in order to collect sensor data there. The significant difference with respect to conventional architectures is that the computing power and all functions are consolidated on the central server ECUs, that is to say that application software is executed only on these control units. All the rest of the ECUs, the so-called zone controllers, "merely" collect data from the various sensors.

The consolidation of the functions on very few control units (servers) means that much more computing power per ECU will be necessary. In order to be able to estimate this computing power, what computing power is made available by what system on a chip is known.

Almost all Ethernet communication networks used in vehicles use a protocol relating to time synchronization that provides a global network time base that is synchronous in all network devices. The prevalence of time-synchronized network devices will continue to increase in the future. One of the greatest challenges for these new server ECUs is the dissipation of heat. The powerful (graphics) processors demand new comprehensive cooling concepts such as also water cooling, for example, as are currently in the planning stage and have already been introduced in series production today in some Tesla vehicles.

The management and the diagnostics of the ECUs and the functions thereof will play an even more significant part than they do today in view of the ever increasing safety requirements. The early detection of faults and critical situations plays an important part here. In future the manufacturers of electronic components will have to accept more responsibility in the automotive supplier industry. They are developing and manufacturing more and more complex and innovative assemblies which are passed on to the vehicle manufacturer as a black box in the supply chain. What remains interesting is the question of whether the required monitoring electronics only detect genuine component faults, or even vehicle components that function entirely satisfactorily must be exchanged because there is doubt about their reliability against the background of functional safety. If thorough analysis then reveals that the exchanged parts function entirely satisfactorily, this nevertheless has effects on the supply chain. In view of warranty periods and future service contracts, however, this question will not be of concern to automobile drivers, to whose very great satisfaction their vehicle will be automatically improved again and again virtually overnight.

In addition to this, the number of control units and their networking among one another are continuously increasing. Besides the actual control functions, diagnostic functions have acquired a greater and greater importance. Whereas diagnostics originally only performed a monitoring function for compliance with legal exhaust gas standards, today they are used in the entire value creation chain of vehicle manufacturers: in development, in testing and validation, in production, and finally in customer service. The convenience functions of modern vehicles are also based for the most part on diagnostic functions.

The IEEE 802.1AS standard, incorporated herein by reference, provides such a protocol relating to time synchronization. Proceeding from a so-called "best clock" in the network, also referred to as a grandmaster or grandmaster clock, a master-slave clock hierarchy is set up. The grandmaster in this case provides the time base for the network, to which all other network devices in the network are synchronized. The grandmaster is determined by means of the so-called Best Master Clock Algorithm (BMCA) and is announced within the network. To do this, IEEE 802.1AS compatible network devices send Announce messages containing information about their internal clock to other network devices that are directly connected. The information about the internal clocks provides an indication of the accuracy of the respective clock, the reference or time reference thereof and other properties that can be used to determine the best clock in the network. A recipient of such an Announce message compares the information received with the features of its own internal clock and any messages already received from another port with information relating to clocks of other network devices, and accepts a clock in another network device if it has better clock parameters. After a short time, the best clock in the network has been ascertained, which then becomes the grandmaster in the network. Based on the grandmaster, messages relating to time synchronization are broadcast over the network. A network device that receives a message relating to time synchronization does not simply forward it, but rather corrects the time information for the previously ascertained delay time on the connection by way of which it receives messages relating to time synchronization from a directly connected network device, and also for the internal processing time, before it retransmits the message relating to time synchronization with the corrected time information.

In the case of the clock hierarchy according to IEEE 802.1AS and the "generalized precision time protocol" (gPTP) defined therein, only a single network device always provides the best clock in the network. This network device therefore controls and regulates the whole time of the vehicle. All other clocks in network devices in the network are governed exclusively by this one clock. Some vehicle manufacturers even synchronize networks of other standards, for example CAN, by way of this Ethernet time master, which means that almost all network devices in the vehicle are informed of the system time by the network device that provides the grandmaster. As a result, a single network device is defined as a single point of failure in the network or the vehicle, the failure or manipulation of which device can have serious effects on the operational safety of the vehicle. As such, for example in vehicles with a high degree of driver support by appropriate systems or with systems for (semi) autonomous driving, a large volume of sensor data captured within a narrow time window must be processed together in order to derive appropriate control signals for actuators in the vehicle. The most accurate possible time registration for sensor data may also be of great importance for documentation purposes, for example when storing in log files that can be analyzed in order to reconstruct malfunctions or operating errors. The latter is of great interest in particular to insurance companies and law enforcement agencies. Safe, synchronized provision of the time information is thus essential.

In addition to this, the number of control units and their networking among one another are continuously increasing. Besides the actual control functions, diagnostic functions have acquired a greater and greater importance. Whereas diagnostics originally only performed a monitoring function for compliance with legal exhaust gas standards, today they are used in the entire value creation chain of vehicle manufacturers: in development, in testing and validation, in production, and finally in customer service. The convenience functions of modern vehicles are also based for the most part on diagnostic functions.

The management and the diagnostics of the ECUs and the functions thereof will play an even more significant part than they do today in view of the ever increasing safety requirements. The early detection of faults and critical situations plays an important part here.

Concepts are already being developed for dynamically transferring functions and applications to other control units/processors in order to optimize them. This is referred to as live migration, reallocation or migration.

A few approaches for detecting changes in the configuration or structure of a communication network using the time synchronization of the network are known from the prior art. An unauthorized change to the configuration of the network may, by way of example, comprise the interposition of a network device to prepare for an attack, which intercepts messages for analysis and, if necessary, retransmits altered messages. This can be used to prevent or at least disrupt safe and proper operation.

By virtue of the new architectures, now for the first time there are possibilities for implementing software on different ECUs as well, since the hardware is becoming more generalized and the software less dependent on the platform. (Of course, this is not possible with all functions and ECUs.) Therefore, what software will run on what control unit (server) is not always definite at the time when the system is designed.

One of the greatest challenges for the new server ECUs is the dissipation of heat. The powerful (graphics) processors demand new comprehensive cooling concepts such as water cooling, for example.

The implementation of cost-effective heat dissipation and monitoring of the new server ECUs constitute a new challenge for the automotive sector. Precisely these new server ECUs form the core of the network, or they will be the sole and central control units in the vehicle in the future-switchoff in the case of problems is hardly a straightforward possibility since they are used for automated driving in order e.g. to fuse sensor data and perform highly complex calculations, etc.

In the case of autonomous driving, in addition there is again an increase in the requirements in respect of the reliability of all subsystems. For the safeguarding of all subsystems, precisely the extended diagnostic functions play an important part. The ever increasing complexity constantly requires the exchange of diagnostic data and these data must also be delivered safely and without errors. One challenge in the next few years will be firstly the safe and reliable transmission of status information and secondly the redundant provision and transmission of these data. For this purpose, new network management concepts will arise which will always have a complete overview of the system and in some instances will also become active from the cloud.

The early detection of faults and critical situations plays an important part here. In future the manufacturers of electronic components will have to accept more responsibility in the automotive supplier industry. They are developing and manufacturing more and more complex and innovative assemblies which are passed on to the vehicle manufacturer as a black box in the supply chain. In the context of functional testing, one task will be whether the required monitoring electronics only detect genuine component faults, or vehicle components that function entirely satisfactorily must be exchanged because there is doubt about their reliability against the background of functional safety. If thorough analysis then reveals that the exchanged parts function entirely satisfactorily, this nevertheless has effects on the supply chain. In view of warranty periods and future service contracts, however, this question will not be of concern to automobile drivers, to whose very great satisfaction their vehicle will be automatically improved again and again virtually overnight.

In addition to this, the number of control units and their networking among one another are continuously increasing. Besides the actual control functions, diagnostic functions have acquired a greater and greater importance. Whereas diagnostics originally only performed a monitoring function for compliance with legal exhaust gas standards, today they are used in the entire value creation chain of vehicle manufacturers: in development, in testing and validation, in production, and finally in customer service. The convenience functions of modern vehicles are also based for the most part on diagnostic functions.

Possible overheating of ECUs will be an even greater problem in the future. Early diagnostics by means of multiple redundant technologies is necessary in order to satisfy the future requirements in respect of security and safety. The control unit can no longer execute software if that causes it to reach its capacity limits.

US 2016 285 462, incorporated herein by reference, discloses a method of manufacturing an oscillator including a resonator element, an oscillation circuit which outputs an oscillation signal by oscillating the resonator element, a temperature compensation circuit which compensates for the temperature characteristics of a frequency of the oscillation signal in a desired temperature range, which method comprises a first temperature compensation step, in which the frequency is measured at multiple temperatures, and first temperature compensation data are calculated on the basis of a relationship between temperature and frequency; and performing a second temperature compensation step, in which, after the first temperature compensation step, the frequency that is ascertained by performing temperature compensation by the temperature compensation circuit on the basis of the first temperature compensation data at multiple temperatures is measured, and the second temperature compensation data are measured on the basis of a relationship between temperature and frequency.

WO 2014111920 A1, incorporated herein by reference, specifies a method and a device for use with a host computer communicating messages with a computer peripheral over a computer bus, where the peripheral may be in multiple states. The peripheral may be an input or output device, or a mass storage device such as a hard disk drive The device communicates with the host computer and the computer peripheral using a proprietary or industry standard protocol or bus, which may be based on a point-to-point serial communication such as SATA. The peripheral state is determined on the basis of monitoring the messages carried over the bus, and the sensor associated with the peripheral operation. The sensor may be a microphone or a camera, and the system may include voice or image processing. The comparison may suggest a malfunction or a suspected operation according to a predefined scheme, and a signal is accordingly generated.

SUMMARY OF THE INVENTION

An aspect of the invention aims to offer technical solutions for the next generation of server ECUs. It is an aspect of the invention to offer further, faster and redundant diagnostic possibilities for the implementation of the power hungry ECUs. The failure of temperature sensors would immediately result in the failure of the ECU, which is why the invention proposes further methods for temperature monitoring. In this case, the intention is to propose additional intelligent mechanisms which provide early indications of faults.

Advantageously, the invention also solves the problem that the failure of temperature sensors would immediately result in the failure of the ECU, which is why the invention advantageously proposes a method for temperature monitoring. In this case, additional intelligent mechanisms which provide early indications of faults are proposed.

Advantageously, the proposed method provides a monitoring function for control units which either do not have such a function or have a defect in the monitoring or the monitoring is not trustworthy and must be plausibilized.

At the present time, up until now it has not been possible to measure temperature without sensors. The invention disclosure advantageously proposes that no temperature sensors are required for ascertaining temperature. Furthermore, a safety function is made possible for the control units in the onboard network.

The invention disclosure proposes a novel intelligent mechanism for monitoring the temperature change or the evolution of heat in the control units. In this case, the invention uses the Ethernet-based time synchronization protocol to detect changes in the ECU temperature.

Ethernet-based time synchronization (will be used in all high-performance ECUs) is realized by the IEEE 802.1AS protocol. In this case, in each ECU a crystal always passes the clock signal to a PLL, which is then matched to the best clock of the network by software. Crystals are influenced by the ambient temperature (to a very much greater extent than by age-approximately 2 powers more).

The physical properties of a crystal and its quality are crucial for the accuracy of the time synchronization (e.g. PTP) forming the basis for the oscillations of the crystal.

Temperature has the greatest influence on the crystal and the accuracy thereof. A typical crystal has the least deviations from its specification at average room temperature of +25° C. The number of oscillations decreases when the external temperature decreases, and the crystal oscillates faster when the external temperature increases, which heats up the crystal. FIG. 5 shows the influence of temperature on AT-cut crystals.

The specification of IEEE 802.1AS recommends a crystal with a quality not worse than ±100 ppm. AT-cut crystals are distinguished by their oscillation over the temperature change corresponding to a cubic curve. As a result, the crystal can operate stably even over relatively large temperature ranges, in comparison with other types of crystal.

The general consideration of the invention is as presented briefly in FIG. 2. By way of delay time measurements with the component to be examined, the clock rate of its Ethernet crystal is ascertained and continuously observed (that does not require any further message exchange or protocols) and the ambient temperature in this ECU can be determined on the basis of the change in the clock rate, since this directly influences the crystal.

The major advantages of the invention arise from the fact that additional redundant mechanisms are implemented, which manages without additional protocols and which further increases the diagnostics capability of our control units. The time synchronization protocol has a very low data usage and is transmitted at a high frequency anyway. The method offers constant monitoring without additional bus load or new protocols.

This method may be implemented in particular in the form of software that can be distributed as an update or upgrade for existing software or firmware of subscribers in the network and in this respect is an independent product. The method can be flashed by OTA into already existing and delivered control units, which, for example, also do not have a temperature sensor or in which the latter is defective or no longer operates reliably. Costs could even be saved as a result.

Detection of whether, by way of example, a neighboring control unit is exposed to particular risk, such as excessively high or excessively low temperature, an error or attack.

The detection of modifications in the network provides another method to ensure data security and functional safety in the onboard network. Should a modified control unit be used, for example, then neither the driver nor the workshop is apparently really aware of this—the network and the control units can however identify errors on the basis of the methods described in this invention. Use of protocols and existing basic functions in the standard Ethernet TSN or AVB means that there is no need for any modifications in the protocol sequence. That is to say that, by this means, the bus load is not increased, nor is there a need for possible modifications in hardware or software at the transmitter.

The method and the resulting control unit are of particular interest for automotive use, since the topic of reliability and safety via Ethernet is of great importance in automobiles and will become increasingly important. In the next few years, the sensors (camera and radar) will also send uncompressed data via Ethernet. Such a data rate necessitates further techniques to make the Ethernet system more fail-safe and performant. This invention helps to facilitate these applications.

An existing problem today and with any new system is the dependency on the communication interfaces and the support therefor. The invention described here enables development much more independently of the platform and thereby makes it possible to lengthen the life cycles of existing SW platforms and controllers.

Earlier detection of errors by means of an indirect early analysis by way of the Ethernet protocol enables temperature changes to be determined at lightning speed. The network system according to the invention is improved in terms of costs and reliability. The testability of the system is defined more clearly by the invention and this allows test costs to be saved. In addition, the invention affords transparent safety functionality. A further possibility for use of the method is in areas in which crystals are used with hardware-based time synchronization and in which the clock rate can be ascertained remotely.

The method for securing the time synchronization in a server ECU, in which a time synchronization takes place according to a time synchronization standard, comprises initializing the time synchronization of the components of the server ECU, storing a unique clock identification of a grandmaster clock determined during the initialization in each of the components of the server ECU that does not provide the previously determined grandmaster clock, identifying a shadow controller selected from the components of the server ECU; transmitting the synchronization messages, querying the sending time with the shadow controller, inserting the time in the follow-up message by way of the controller that forms the grandmaster clock, and retransmitting, sending (206) additional messages relating to time synchronization by way of selected network devices that do not provide the previously determined grandmaster clock, wherein the time information sent in the additional messages relating to time synchronization and also the clock parameters relevant for determining the best clock by means of BMCA and the domain number match those of the previously determined grandmaster clock, or are comparable with them, and wherein the additional messages relating to time synchronization contain a unique clock identification corresponding to the identification of the respective selected network device.

It is particularly advantageous if the initialization of the time synchronization is carried out in a safe environment in which an attack can be ruled out with sufficiently high probability, for example at the end of a production process by way of which a product containing the secure network is manufactured. One-off initialization may suffice, above all, if the network, or the configuration thereof, does not change again after the initialization, for example in vehicles of all kinds.

The method according to the invention also comprises sending additional messages relating to time synchronization by way of selected network devices that do not provide the previously determined grandmaster clock, wherein the time information sent in the additional messages relating to time synchronization and also the clock parameters relevant for determining the best clock by means of BMCA and the domain number match those of the previously determined grandmaster clock, or are comparable with them. However, the additional messages relating to time synchronization contain a unique clock identification corresponding to the identification of the respective selected network device. The clock parameters relevant for performing the BMCA comprise in particular the values for the variables priority1, priority2, clockClass, clockAccuracy, offsetScaledLogVariance and timeSource according to the IEEE 802.1AS standard. To anyone listening in on the network traffic, each of the additional messages relating to time synchronization that are sent by the selected network devices thus appears to come from a grandmaster clock, as do the messages relating to time synchronization from the grandmaster clock determined during the initialization, which means that the observer sees a multiplicity of grandmaster clocks existing in the network.

The selected network devices preferably send their additional messages relating to time synchronization in cycles that correspond to those of the grandmaster clock determined during the initialization. Each of the selected network devices thus represents a kind of pseudo-grandmaster clock that behaves as if it were the only and also the best clock in the network. For an outside observer, the pseudo-grandmaster clocks cannot be distinguished from the grandmaster clock determined during the initialization, despite the fact that the time synchronization trees differ in respect of the dissemination of the messages relating to time synchronization within the network, since the additional messages relating to time synchronization are sent with the same domain number.

The selected network devices can start sending the additional messages relating to time synchronization as soon as the unique clock identification of the grandmaster clock determined during the initialization has been sent to all network devices. However, it is also possible to start sending the additional messages relating to time synchronization only when a first time synchronization of all network devices in the network has been completed.

Each of the additional messages relating to time synchronization is forwarded in compliance with the standard by all network devices in the same manner as the messages relating to time synchronization that are sent by the grandmaster clock determined during the initialization. This means that after the time information has been corrected for the delay time on the receive link and the internal processing time, a message relating to time synchronization is sent to other directly connected network devices.

The network devices are connected to one another by way of physical interfaces. Messages relating to time synchronization are sent via a logical port defined for the interface, which means that there are point-to-point connections for the time synchronization between two network devices even when physical transmission media are shared. In the present description, the term interface is used synonymously with the term port, unless the context reveals otherwise.

The method according to the invention makes identifying the grandmaster clock determined during the initialization considerably more difficult or even impossible for an observer who begins to listen in on the network traffic only after the initialization has been completed.

The selection of the network devices that send their own messages relating to time synchronization in addition to the grandmaster clock, and thereby masquerade as the grandmaster clock, may comprise a check to determine whether a network device is essential to the operation of the network or of a system containing the network, and therefore should not be used as a decoy for a possible attack. Essential network devices are, for example, those that connect multiple network segments to one another, such as e.g. a switch, a bridge, or on which functions are implemented that cannot be undertaken by other network devices, such as e.g. a domain computer for automated or autonomous driving or other safety-related functions. Such network devices are preferably not selected. The selection may also involve checking whether a network device is configured to execute generic functions or software that can also be executed by another network device within the network and can accordingly be relocated to one of these other network devices if necessary, for example if an attack on a network device is detected. Such network devices can preferably be selected to send their own messages relating to time synchronization, as can network devices that are situated at the edge of the network and/or provide non-safety-related functions and whose isolation from the rest of the network would not lead to major malfunctions in the event of a detected attack. The same applies to network devices to which only a few other network devices are connected, for example network devices having only one port and accordingly only one neighbor, and that can therefore be isolated more easily. The selection of network devices to send their own messages relating to time synchronization can also preferably involve network devices that are provided with particularly strong safety mechanisms and are therefore better able to withstand attacks. In a simple case, the selection of network devices to send their own messages relating to time synchronization may comprise reading a flag that was set when the network device was manufactured or configured for operation in the network. Other features for determining whether a network device can be configured to send additional messages relating to time synchronization can be determined by appropriate functional queries.

In network devices that do not provide the grandmaster clock determined during the initialization, the method according to the invention also comprises receiving messages relating to time synchronization on a first network interface and a check to determine whether the clock identification transmitted in the message relating to time synchronization matches the stored clock identification of the grandmaster clock determined during the initialization. If the clock identifications match, a local clock is synchronized using the time information received in the message relating to time synchronization.

A further development of the method according to the invention comprises monitoring the time information transmitted in additional messages relating to time synchronization for a difference in relation to time information transmitted in messages relating to time synchronization containing the clock identification of the grandmaster clock determined during the initialization. As long as a network device is synchronized with the grandmaster clock determined during the initialization, the time information on which the comparison is based can also be provided by the clock of the network device. If a difference in the time information has been detected, additional messages relating to time synchronization containing the associated clock identification for which a difference has been detected can be blocked, i.e. not forwarded to the network. Should the difference be the result of an attack on the network device, an attacker who is monitoring the network only at one point will not notice the blocking because messages relating to time synchronization are not acknowledged by a recipient. Alternatively, the differing time information transmitted in the received additional message relating to time synchronization can be corrected and forwarded on the basis of time information received from the grandmaster clock determined during the initialization. The basis for the time correction may also be the local clock synchronized with the grandmaster clock determined during the initialization. Alternatively or additionally, a corresponding message may be sent to a previously defined network device of the network that is configured to initiate and/or control suitable protective measures. Suitable protective measures may comprise, by way of example, isolating that network device or individual streams or messages from that network device that is sending the differing time information from the rest of the network, or restarting the network device in question.

One embodiment of the method according to the invention comprises the sporadic or cyclic sending, by the grandmaster clock determined during the initialization, of messages relating to time synchronization in which the time information differs from the actual time, and the monitoring of the additional messages relating to time synchronization that are sent by the other network devices for whether they reflect the differing time information accordingly. If this is not the case—inevitable tolerances during the synchronization can be ignored—there may be a malfunction or an attack, and the network device that provides the grandmaster clock determined during the initialization can send a corresponding message to a previously defined network device of the network that is configured to initiate and/or to control suitable protective measures, for example isolates the network device that does not reflect the changes in the differing time information from the rest of the network. If the additional messages relating to time synchronization that are sent by the other network devices reflect the changed time information, it can be assumed that all pseudo-grandmaster clocks are behaving in accordance with the rules.

A computer program product according to the invention contains instructions that, when executed by a computer, cause said computer to perform one or more embodiments and further developments of the method described above.

The invention disclosure proposes a novel intelligent mechanism for monitoring the temperature change or the evolution of heat in the control units. In this case, the method uses the Ethernet-based time synchronization protocol to detect changes in the ECU temperature.

Ethernet-based time synchronization (will be used in all high-performance ECUs) is realized by the IEEE 802.1AS protocol. In this case, in each ECU a crystal always passes the clock signal to a PLL, which is then matched to the best clock of the network by software. Crystals are influenced by the ambient temperature, to a very much greater extent than by the age of the crystals.

The physical properties of a crystal and its quality are crucial for the accuracy of the time synchronization (e.g. PTP) forming the basis for the oscillations of the crystal. Temperature has the greatest influence on the crystal and the accuracy thereof. A typical crystal has the least deviations from its specification at average room temperature of +25° C. The number of oscillations decreases when the external temperature decreases, and the crystal oscillates faster when the external temperature increases, which heats up the crystal. FIG. 5 shows the influence of temperature on AT-cut crystals.

The specification of IEEE 802.1AS recommends a crystal with a quality not worse than ±100 ppm. AT-cut crystals are distinguished by their oscillation over the temperature change corresponding to a cubic curve. As a result, the crystal can operate stably even over relatively large temperature ranges, in comparison with other types of crystal.

The general concept and solution of the invention is presented briefly in FIG. 6. By way of delay time measurements with the component to be examined, the clock rate of its Ethernet crystal is ascertained and continuously observed (that does not require any further message exchange or protocols) and the ambient temperature in this ECU can be determined on the basis of the change in the clock rate, since this directly influences the crystal.

The controller that has implemented the time master functionality needs to attend to specific interrupts and also reserve resources therefor. As a result of the invention disclosure, however, almost any controller may be used, which in turn reduces system costs and resources.

The effect provided by the method, namely protection against unauthorized attack on the time synchronization, distortion of the communication, and against the exchange of devices, can also be achieved in other ways and with an even higher safety level, for example by using hardware encryption (or authentication). The method allows protective mechanisms to be provided more cheaply (useful for meeting ISO26262 requirements) and also reduces system costs. The method could even be imported later via OTA.

By contrast, in vehicles, it is generally not economical to buy hardware equipment sufficient for seamlessly encrypted communication for all subscribers connected to the network. The method described requires significantly fewer hardware resources (can be put into action using existing implementations) and thus significantly increases the safety level without this necessarily being linked to higher production costs for the network or devices connected thereto.

This method may be implemented in particular in the form of software that can be distributed as an update or upgrade for existing software or firmware of subscribers in the network and in this respect is an independent product.

The quality of the execution of software-based applications (e.g. automated driving) can advantageously be increased by the invention, in particular without additional financial outlay. The use of the newly introduced Ethernet protocol in automobiles necessitates mechanisms that make use of simple techniques and given properties of technologies in order to be able to do without expensive implementations and further additional hardware. The network system according to the invention is improved in terms of cost and reliability. By means of software-based methods, Continental can thereby get the best out of its ECU or the network and offer customers more functionality.

Advantageously, the safety of a vehicle network can be increased significantly and very simply by the invention, in particular without additional financial outlay. The use of the newly introduced Ethernet protocol in automobiles necessitates mechanisms that make use of simple techniques and given properties of technologies in order to be able to do without expensive implementations and further additional hardware. Earlier detection of attacks and abnormal behavior by means of early analysis of the communication paths allows gaps and errors to be identified before the vehicle is delivered. The network system according to the invention is improved in terms of cost and reliability. The testability of the system is defined more clearly by the invention and this allows test costs to be saved. In addition, the invention affords transparent safety functionality.

Today, applications are implemented, tailored and adapted to one vehicle type. This presented method allows the software to be designed more flexibly and value added services to be generated from the underlying system without having permanently programmed it into the software beforehand. Today we actually have to assume the worst case, which costs resources (money) and loses quality. The invention permits software developers and software architects to provide software/applications that can be tailored to the requirements of the application more flexibly and precisely. Incorporating the cited methods into software allows optimization to take place within the control unit. This means that the software can be designed to be more independent of platform and vehicle type.

The new technologies can no longer be held back in automobiles. Protocols such as IP, AVB and TSN have thousands of pages of specifications and test suites. It is not an immediate given that these new protocols are controllable in automobiles.

The new method can be integrated into an existing network without damaging existing devices. The standard is not violated since the existing protocol can be used.

Use of the method would also be possible for other communication systems with clock synchronization components and embedded systems.

The computer program product may be stored on a computer-readable medium or data carrier. The data carrier may be in a physical embodiment, for example as a hard disk, CD, DVD, flash memory or the like; however, the data carrier, or the medium, may also comprise a modulated electrical, electromagnetic or optical signal that can be received by a computer by means of an appropriate receiver and can be stored in the memory of the computer.

A network device at least according to the invention comprises at least one physical communication interface in addition to a microprocessor and nonvolatile and volatile memory and also a timer. The components of the network device are communicatively connected to one another by means of one or more data lines or data buses. The memory of the network device contains computer program instructions that, when executed by the microprocessor, configure the network device to implement one or more embodiments of the method described above.

The present invention protects the grandmaster by disguising or hiding the trace thereof, which was previously easy to find, by way of a multiplicity of false traces, making it more difficult for attackers to determine the position of the grandmaster within the network. The attacker is then no longer able to attack at all, or at least needs considerably more time. Attacks that do not coincidentally immediately affect the grandmaster can be detected and suitable defense measures can be taken while the system still remains synchronized with the required accuracy.

The method according to the invention can be implemented using existing network devices, wherein if necessary only adjustments in the software or in the state machines used for receiving and processing messages relating to time synchronization are required in order to use only the messages relating to time synchronization that come from the grandmaster clock ascertained during the initialization to synchronize the clocks, but still to forward the additional messages relating to time synchronization and not simply delete them. As a result, only low additional costs are incurred for the implementation, if at all. Even existing systems can be configured to implement the method, by way of appropriately changed software. Another advantage of the method according to the invention is that the particular underlying hardware platform is irrelevant as long as it supports synchronization according to the IEEE 802.1AS standard.

BRIEF DESCRIPTION OF THE DRAWING

The invention will be explained below by way of example with reference to the drawing. In the drawing:

FIGS. 1.1A-1.1C show designs of known oscillators;

FIG. 2.1 shows the frequency-temperature characteristic of various crystal types;

FIG. 3.1 shows the general sequence of the method according to the invention;

FIG. 4.1 shows a system model of the time synchronization of Ethernet temperature influences;

FIG. 5.1A shows the ascertainment of the first NRR (frequency offset with respect to the own clock);

FIG. 5.1B shows the mode of operation of the delay time measurement;

FIG. 6.1 shows the ascertainment of the temperature change by way of changing the clock rate (or the arrival of time synchronization messages);

FIG. 7.1 shows the ascertainment of the temperature or the temperature increase in the ECU;

FIG. 8.1 shows the use of the method in the decision for the relocation of software/resources.

Identical or similar elements may be referenced using the same reference signs in the figures.

DESCRIPTION OF EXEMPLARY EMBODIMENTS

Figure 1A:
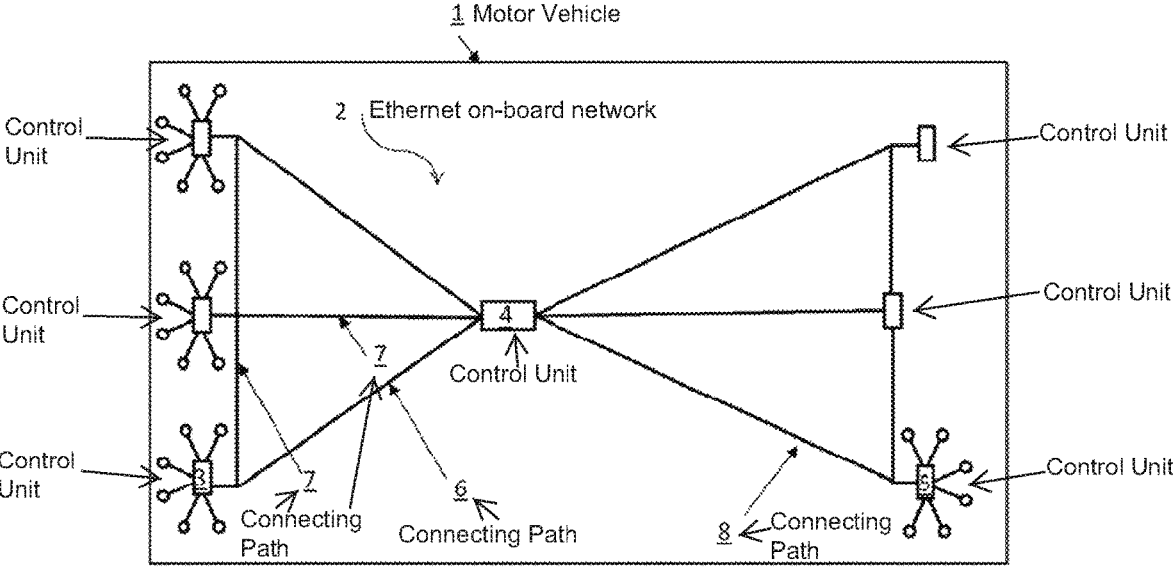
FIG. 1A shows a schematic plan view of a motor vehicle having an exemplary embodiment of an Ethernet onboard network according to the invention.

FIG. 1A shows a motor vehicle 1 in plan view. The motor vehicle 1 comprises an Ethernet onboard network 2. The Ethernet onboard network 2 in turn comprises, according to the exemplary embodiment, a plurality of control units 3, 4, 5, which may also be referred to as control apparatuses or control devices. The control units are connected to one another by way of connecting paths. On account of the existing topology of the Ethernet onboard network 2 in the exemplary embodiment, there are multiple parallel communication paths between the control units. The connecting paths may be formed from different media types or materials, for example.

As the number of Ethernet variants increases, the dynamic change in the connection speed will also be used, for example. This means, for example, that the speed can be changed at run time. For example, a 10 Gbit/s connecting path can be changed to 100 Mbit/s so that energy is saved. Since this is a dynamic function, it may be the case that the onboard network is in a different form after delivery or after initial installation in the motor vehicle than after a software update or in a fault situation, for instance.

The Ethernet onboard network 2 comprises at least one first control unit 3, a second control unit 4 and, in addition, a third control unit 5. The first control unit 3 is connected to the second control unit 4 by a first connecting path 6. Furthermore, the first control unit 3 according to the exemplary embodiment is also connected to the second control unit 4 by a second connecting path 7.

The first control unit 3, the second control unit 4 and/or the third control unit 5 may be in the form of a control device or network switch, for example. The second control unit 4 and the third control unit 5 are connected to one another by a third connecting path 8.

According to the exemplary embodiment in FIG. 1A, the first control unit 3 and the second control unit 4 are connected to one another directly by way of the first connecting path 6, whereas the first control unit 3 and the second control unit 4 are connected only indirectly by way of the second connecting path 7, since the second connecting path 7 is divided into two parts by a further control unit. According to another exemplary embodiment, the second connecting path 7 can also connect the first control unit 3 and the second control unit 4 to one another directly, however.

Generally speaking, the method is suitable for detecting errors in the synchronization.

Figure 2:
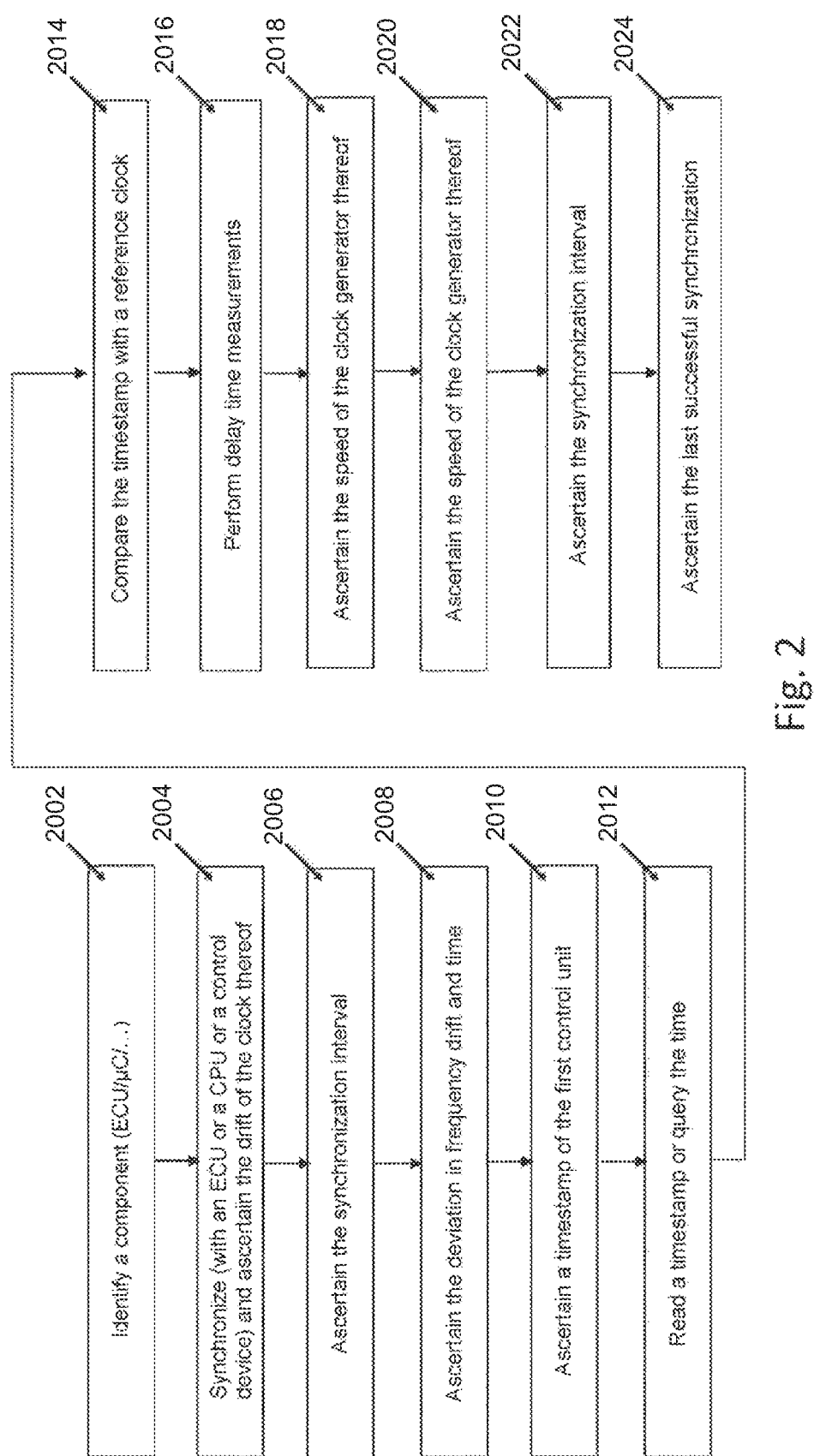
FIG. 2 shows a complete sequence for the method and the determination of the current time of the node to be examined and the clock generator properties thereof.

As shown in FIG. 2, it is possible to calculate or determine the duration of asynchronism, or the time at which and the last time that synchronization was performed correctly. On the basis of an existing synchronization, the method proposes ascertaining the inaccuracy of the clocks in the network, e.g. of the "my" neighbor ECU or of the "neighbor" CPU, which may be located within the same ECU. On the basis of these ascertained data, a timestamp of this component, in conjunction with "my" own clock or that of the grandmaster, and the synchronization interval can be used to calculate how much time has passed since the last synchronization. For example, at Step 2002 a component (ECU/μC/ . . . ) is identified; at Step 2004 Synchronizing (with an ECU or a CPU or a control device) and ascertaining the drift of the clock thereof; at Step 2006 Ascertaining the synchronization interval; at Step 2008 Ascertaining the deviation in frequency drift and time; at Step 2010 Ascertaining a timestamp of the first control unit; at Step 2012 Reading a timestamp or query the time; at Step 2014 Comparing the timestamp with a reference clock; at Step 2016 Performing delay time measurements; at Steps 2018 and 2020 2020 Ascertaining the speed of the clock generator thereof; at Step 2022 Ascertaining the synchronization interval; and at Step 2024 Ascertaining the last successful synchronization. It is thus possible to ascertain when the last successful synchronization took place. At a time that is also called the ascertainment time, a timestamp from an ECU of a control device for which it is desirable to know whether it is still in sync is recorded. A series of parameters are then taken as a basis for ascertaining for how many synchronization intervals, or since what time, this component has no longer been successfully synchronized, as is visualized by way of example in FIG. 4.

The method thus determines when the last successful synchronization of a node took place and thus also for how long the node has no longer been synchronized. This is the basis for deciding whether or not the sensor data are trustworthy and therefore usable.

Figure 4:
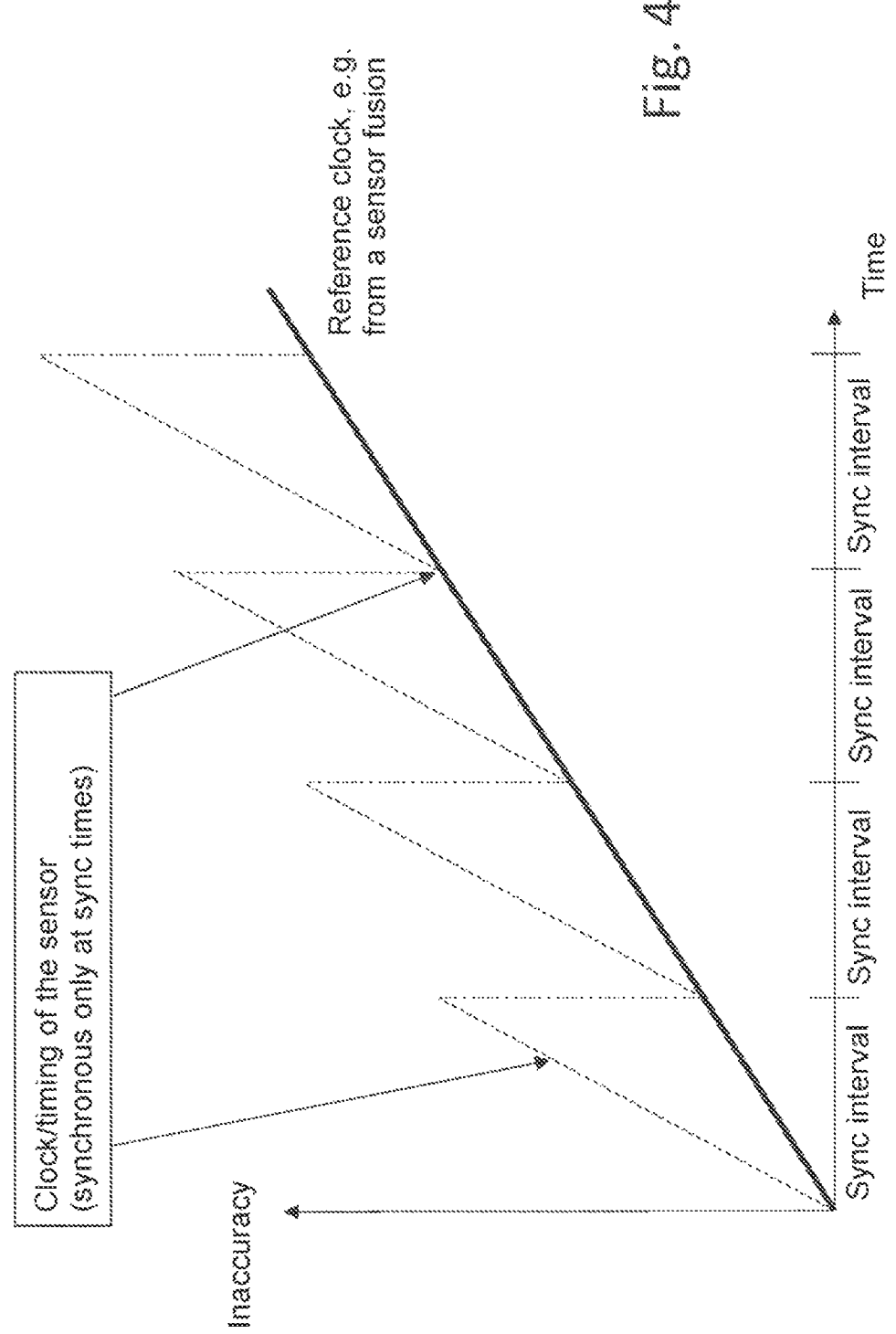
FIG. 4 shows a representation of a sawtooth model of a frequency drift when time synchronization is successful.
Figure 5:
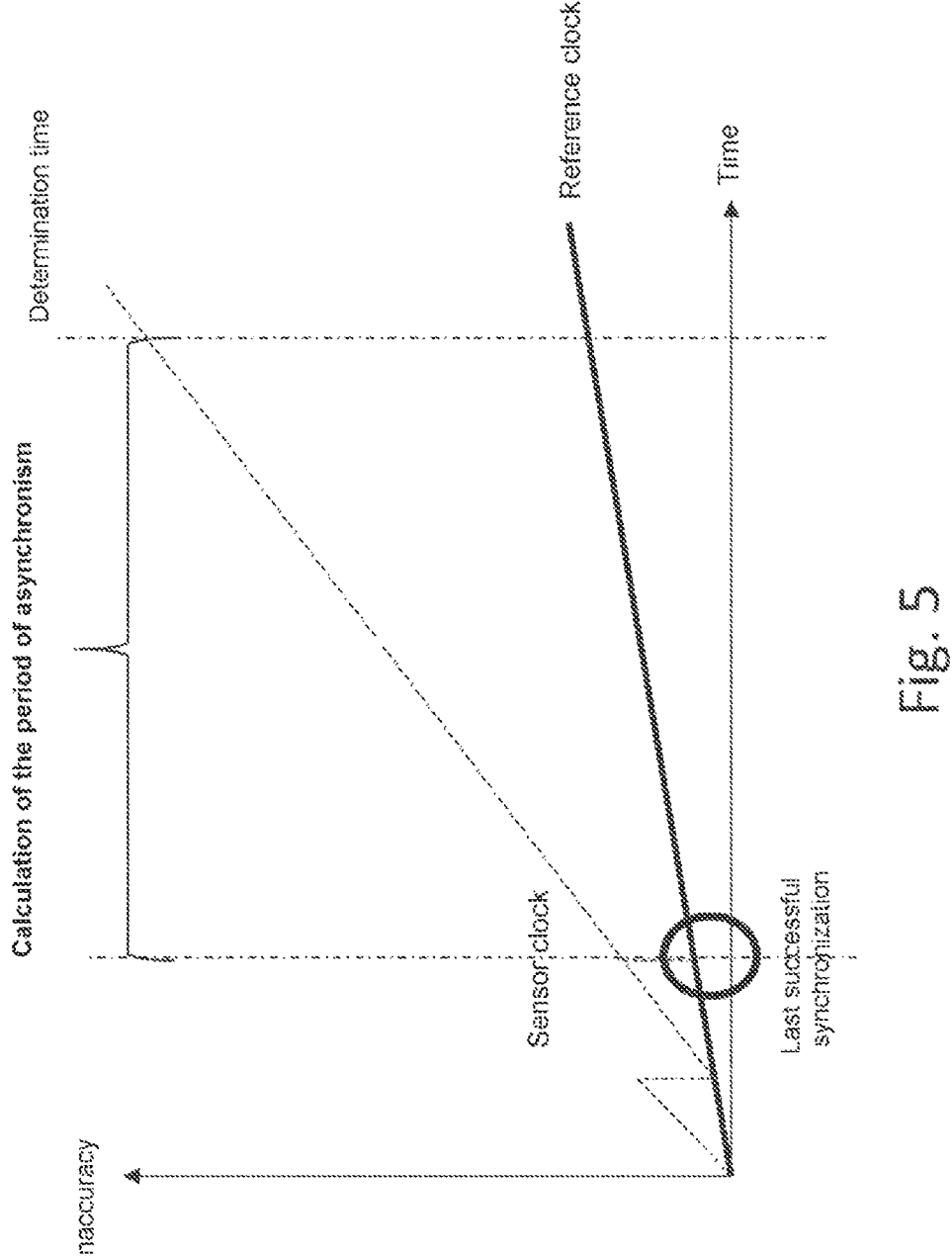
FIG. 5 shows a graphical representation of the calculation of the period of asynchronism.

FIG. 4 generally illustrates the synchronization of a message-based time synchronization. After synchronization messages arrive, the internal clock or the offset is adjusted. The clock then continues to run with its own characteristics until the next synchronization.

As can be seen from FIG. 2, the method begins by asking the node, or a μC or switch or the entire ECU or the control unit 3, 4, 5, about its time or by reading the latter by means of a timestamp. This value is stored. The method then determines the frequency drift of the timer by means of the 802.1AS protocol (Pdelay query). In this way, cyclic messages, which actually serve to measure the delay time and are transmitted anyway, are used to calculate the speed at which the clock generator of this ECU/μC or the entire ECU or a control unit 3, 4, 5 operates.

Figure 3:
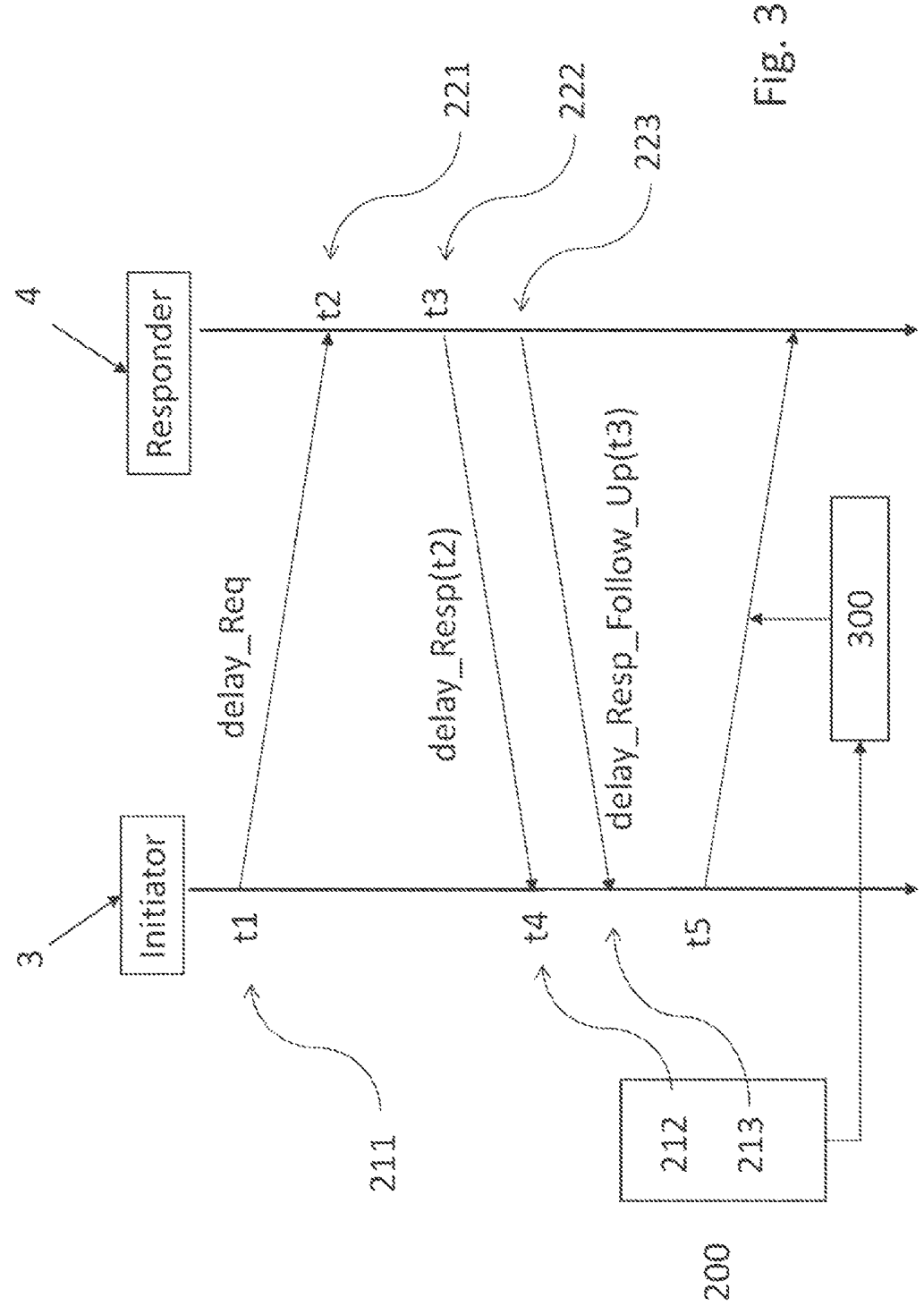
FIG. 3 shows a flowchart for the encryption of the time synchronization messages for determining a type of a transmission medium of the respective connecting path.

The procedure according to the sequence from FIG. 3 is used for measuring delay time. One port, the initiator, starts the measurement by sending a Delay_request message to the port to which it is connected, the responder, and generating an exit timestamp t1. This exit timestamp denotes a hardware timestamp that is written as late as possible on leaving the Ethernet transceiver. When this packet arrives, the responder generates a timestamp t2. In response, the responder sends a Delay_Response message. In this message it transmits the reception timestamp t2 for the Delay_Request message. When this message leaves the responder, the responder in turn generates a timestamp t3, which is sent out in an immediately subsequent Delay_Response_Follow_Up message. When the initiator receives the Delay_Response message, it generates a timestamp t4. The initiator can use the four timestamps t1 to t4 to calculate the average delay time for the routes covered.

PTP defines a master/slave clock hierarchy with a best clock within a network. The time base for the nodes in this network is derived from this clock, the grandmaster. The Best Master Clock Algorithm (BMCA) is used to determine this clock type and to announce this information in the network. IEEE 802.1AS compatible systems cyclically send Announce messages to their neighboring nodes with information about the best clock in the cloud. The recipient of such a message compares this information with the features of its clock and any messages already received from another port. A time synchronization spanning tree is set up on the basis of these messages. During this process, each port is assigned one of four port statuses. The port that has a shorter path to the grandmaster than its link partner is provided with the "master port" status. The "slave" status is assigned when no other port at this node has this status yet. Disabled is selected by the port that cannot fully support the PTP protocol. The "passive" status is selected if none of the other three statuses applies.

Finally, the time information is exchanged by way of the Sync_Follow_Up mechanism. The master ports cyclically send Sync and Follow_Up messages to the neighboring link partner. When the sync message leaves the master port, a timestamp is generated, which is immediately transmitted in a subsequent Follow_Up message. This timestamp corresponds to the current time of the grandmaster at the time at which the sync message was sent. The messages originating from the grandmaster are not forwarded, but rather regenerated in each node, including the switches.

Figure 6B:
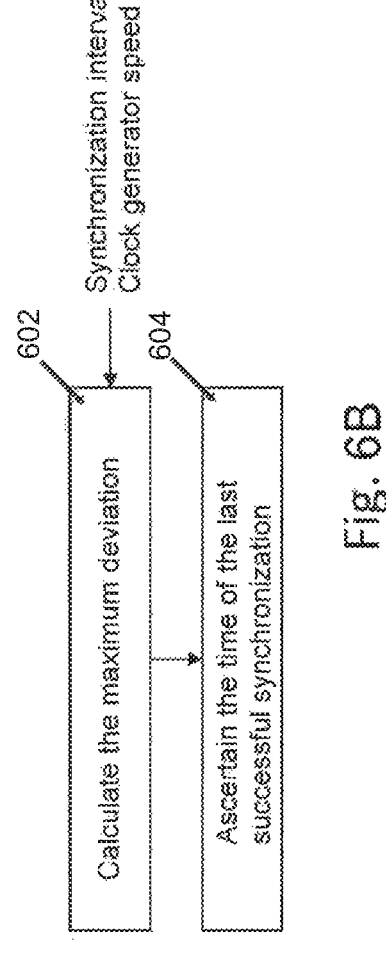
FIG. 6B shows the ascertainment of the time of the last successful synchronization.
Figure 6A:
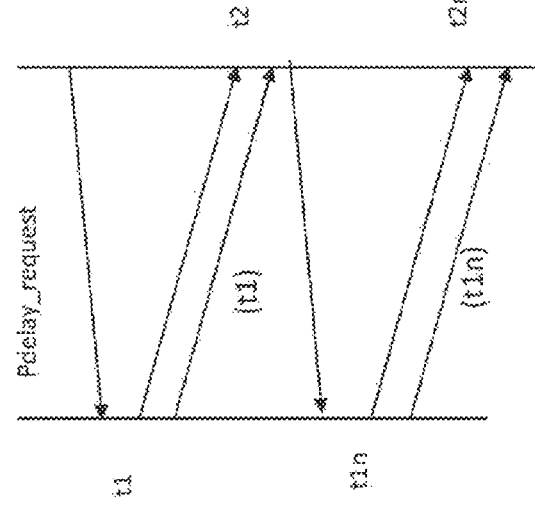
FIG. 6A shows a sequence for the determination of an offset of a sensor for a sensor fusion.

As indicated in FIG. 6A, the speed of the clock generator can be ascertained or calculated using the PTP NRR (neighbor rate ratio) method. Cyclic PDelay messages are used to calculate the speed (offset) of the clock generator in relation to the reference clock. The read or queried time (Tsuspect) is assigned to the current system time (Treference), thus the time that is trusted, either the grandmaster or the time for which the data are important. If the component to be examined is a sensor, then the sensor fusion time could be used as reference. This means that the difference between the two times is ascertained first.

$$Tdeviation = Treference - Tsuspect$$

The synchronization frequency can first be used to calculate how large Tdeviation should be at most: In the case of Ethernet, the interface between PHY (transceiver) and MAC is the definitive interface for recording the time information. This interface (xMII) is clocked at a nominal frequency f of 25 MHz. Crystals for automotive Ethernet AVB/TSN compatible implementations must not exceed a maximum inaccuracy fo of ±100 ppm. Thus, the worst possible crystal in connection with the interface causes a frequency deviation of 5 kHz in relation to the nominal frequency f according to the formula:

$$df = (f * fo)/10^6$$

The change in the period between the maximum (25002500 Hz) and the minimum frequency (24997500 Hz) is 8 ps for a period duration of 40 ns. This means that in 40 ns two crystals (and thus two ECUs) can have a maximum time difference of 8 ps at +25° C. Exactly 3125000 periods of 40 ns each are possible in the standard synchronization interval of 125 ms, which corresponds to a maximum deviation of 25 μs.

According to the IEEE802.1AS specification, the synchronization interval can be between 31.25 ms and 32 seconds. This means a worst case deviation of 6.25 us for the smallest interval and of 6.4 ms for the largest interval.

FIG. 6B at Steps 602 and 604 schematically indicates how the method uses the preceding formula to calculate when the last synchronization took place, by ascertaining the speed of the clock generator and knowledge of the synchronization interval Tdeviation.

Figure 1B:
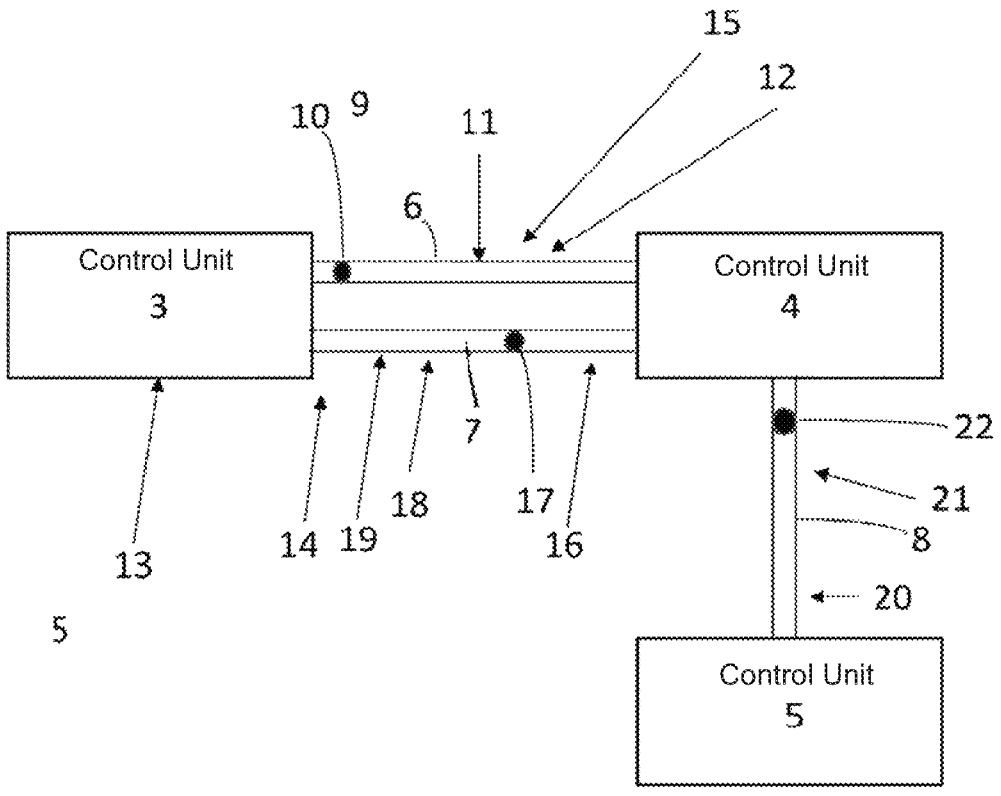
FIG. 1B shows a schematic representation of the Ethernet onboard network having a first control unit, a second control unit and a third control unit, which are connected by way of a first connecting path, a second connecting path and a third connecting path.

In the exemplary embodiment of the Ethernet onboard network 2 that is shown in FIG. 1B, the first control unit 3, the second control unit 4 and the third control unit 5 have. Furthermore, the Ethernet onboard network 2 also has the first connecting path 6, the second connecting path 7 and the third connecting path 8. According to the exemplary embodiment, a delay time 9 of a first signal 10 on the first connecting path 6 is determined. The delay time 9 describes the length of time for which the first signal 10 is in transit from the first control unit 3 to the second control unit 4, or vice versa, via the first connecting path 6. A maximum speed 11 of the first connecting path 6 is determined on the basis of the delay time 9 of the first signal 10. The maximum speed 11 of the first connecting path 6 varies in this case depending on the length of the cable, the speed of the transmission and/or the media type, or the type of the transmission medium, for example. A type of a transmission medium 12 of the first connecting path 6 is determined on the basis of the maximum speed 11.

According to this exemplary embodiment, the type of the transmission medium 12 is determined as optical, copper or wireless. In the case of optical, the first connecting path 6 is in the form of an optical fiber connection, for example. In the case of copper, the first connecting path is formed, for example, by cables having twisted pairs of wires, for example an unshielded twisted pair (UTP) cable. In the case of wireless, the first connecting path 6 is substantially in the form of a radio link and the first control unit 3 and/or the second control unit 4 has/have a radio receiver and/or a radio transmitter, or is/are connected thereto.

The control unit 3 ascertains a delay time for the data transfer via the onboard network to the control unit 4. The important factor is that the delay time is ascertained in some form on the basis of an actual physical condition of the transmission path from the first control unit 3 to the control unit 4, i.e. there is a physical condition or property of the transmission path that, when it changes, results in a change in the ascertained delay time.

In this case, one control unit 3 ascertains a delay time for the data transfer via the network to the control unit 4. This can be done in an alternative way. For example, the delay time may occur in the course of a time synchronization between the first subscriber and the second subscriber, for instance according to the time synchronization standard IEEE 802.1AS and the PTP protocol contained therein. The "delay request" and "peer delay" messages implemented within the scope of this protocol can thus be used as data packets, for instance. However, the method is not restricted to this. The important factor is only that the delay time is ascertained in some form on the basis of an actual physical condition of the transmission path from the first subscriber/control unit 3 to the second subscriber/control unit 4, i.e. there is a physical condition or property of the transmission path that, when it changes, results in a change in the ascertained delay time.

Furthermore, the first control unit 3 ascertains the message frequency, which in principle is derived from the speed of the PLL and crystal, of the opposite control unit 4. From these two values, which change constantly due to temperature, aging, etc., the control unit 3 derives a key for encrypting these time messages.

The time synchronization messages are encrypted using the generated dynamic key, which, expressed in general terms, can be derived from individual parameters relating to the connection partner.

As shown in FIG. 3, an individual and constantly changing key is additionally generated on the basis of the line delay 221 and the message frequency 213. This key is unique per unit time and also different per link. As a result of this approach, there is no key twice in the network. Generating the keys from the combination of point-to-point line delay and the frequency of the crystal makes the key particularly resistant to attempts to circumvent it, since firstly the key is constantly changing and secondly it will be different on each link in the vehicle network.

The two values can either be used directly in combination or can be expanded by other static values, which must be known to both control devices, such as for example the address, in order to generate the keys. The respective control unit, the method being able to be executed on both control units, or subscribers/link partners, ascertains a random value therefrom in order to obtain the individual key for the encryption, which key is valid only for a short time. The key changes again and again, based on the preceding measurements, which do not represent any additional effort, since they are used for time synchronization.

The type of the transmission medium 12 is communicated to a program 13 in the Ethernet onboard network 2. The program 13 may be present, for example, in the first control unit 3, the second control unit 4 or the third control unit 5 or a further control unit of the Ethernet onboard network 2. The type of the transmission medium 12 is taken as a basis for adapting a connecting path selection 14. As such, the program 13 can use the connecting path selection 14, for example, to send data by way of a different connecting path than before the connecting path selection. However, the program 13 can also interrupt the sending of data by way of the connecting path selection 14, for example, and can resume it at a later time.

According to the exemplary embodiment, a transmission security value 15 is assigned to the first connecting path 6 on the basis of the type of the transmission medium 12. The transmission security value describes a probability of loss of data transmitted by way of the connecting path. That is to say that the transmission security value 15 permits a statement about how reliably the data can be transmitted by way of the first connecting path. This is supplied to the entropy source 200. If a security limit value is not reached, for example, and the data can be transmitted only unreliably, then it must be expected that the data will reach their destination with a delay or, if it is not worth sending the data again on account of the requirement for the data to be up to date, will not reach their destination at all.

According to a further exemplary embodiment, delay times of a plurality of signals on the first connecting path 6 are determined and the fastest delay time of the plurality of signals is selected. The maximum speed 11 of the first connecting path 6 is then determined on the basis of the fastest delay time.

Figure 7:
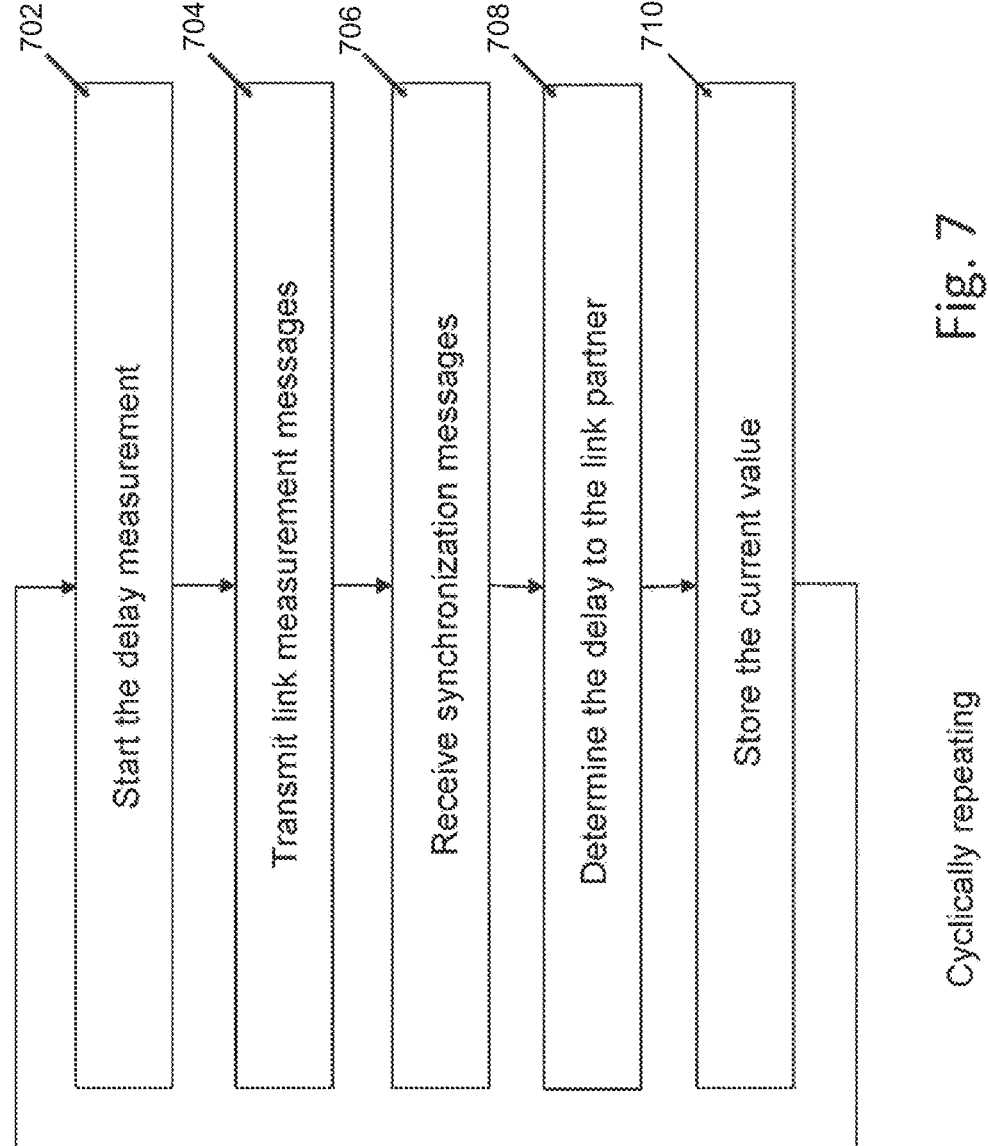
FIG. 7 shows a flowchart for the determination of the individual crystal frequency.

For example, referring to FIG. 7, Steps 702-710 a control unit starts the delay measurement and waits to receive the link partner messages. Based on reception of the messages using the PTP example, the line delay can be measured. If one link partner starts the delay measurement, the other link partner will inevitably notice this and should also start a measurement so that these two measurements can also generate a related measured value.

The type of the transmission medium 12 for the second connecting path 7 and/or the third connecting path 8 can also be determined analogously to the approach described above.

The respective recorded values are different, remain secret and stored in the control device each time and are also not transmitted over the network-nor do they have to be. Discovery of the key by mere trial and error is sufficiently improbable. An individual key is generated by taking the two values into account. First, the frequency of each crystal is different, and second, the line delay of each link is different. Here, two fluctuating values are added together, giving a third value—the value of the key—that is even harder to guess. The line delay may typically be in the range of 50-500 nanoseconds and the frequency is a parameter and is given in +/−ppm. The round-trip line delay is based on the same channel, which is why the calculated values on both sides of the link are identical. The parameters therefore do not have to be exchanged. This means that both partners have the same values for generating the key at almost the same time. One link partner encrypts using these two values resulting from the last measurement and the other link partner decrypts using its last values.

There is thus also provision for a delay time 16 of a second signal 17 on the second connecting path 7 to be determined. A maximum speed 18 of the second connecting path 7 is then determined on the basis of the delay time 16 of the second signal 17. A type of the transmission medium 19 of the second connecting path 7 is in turn determined on the basis of the maximum speed 18 of the second connecting path 7.

Figure 8:
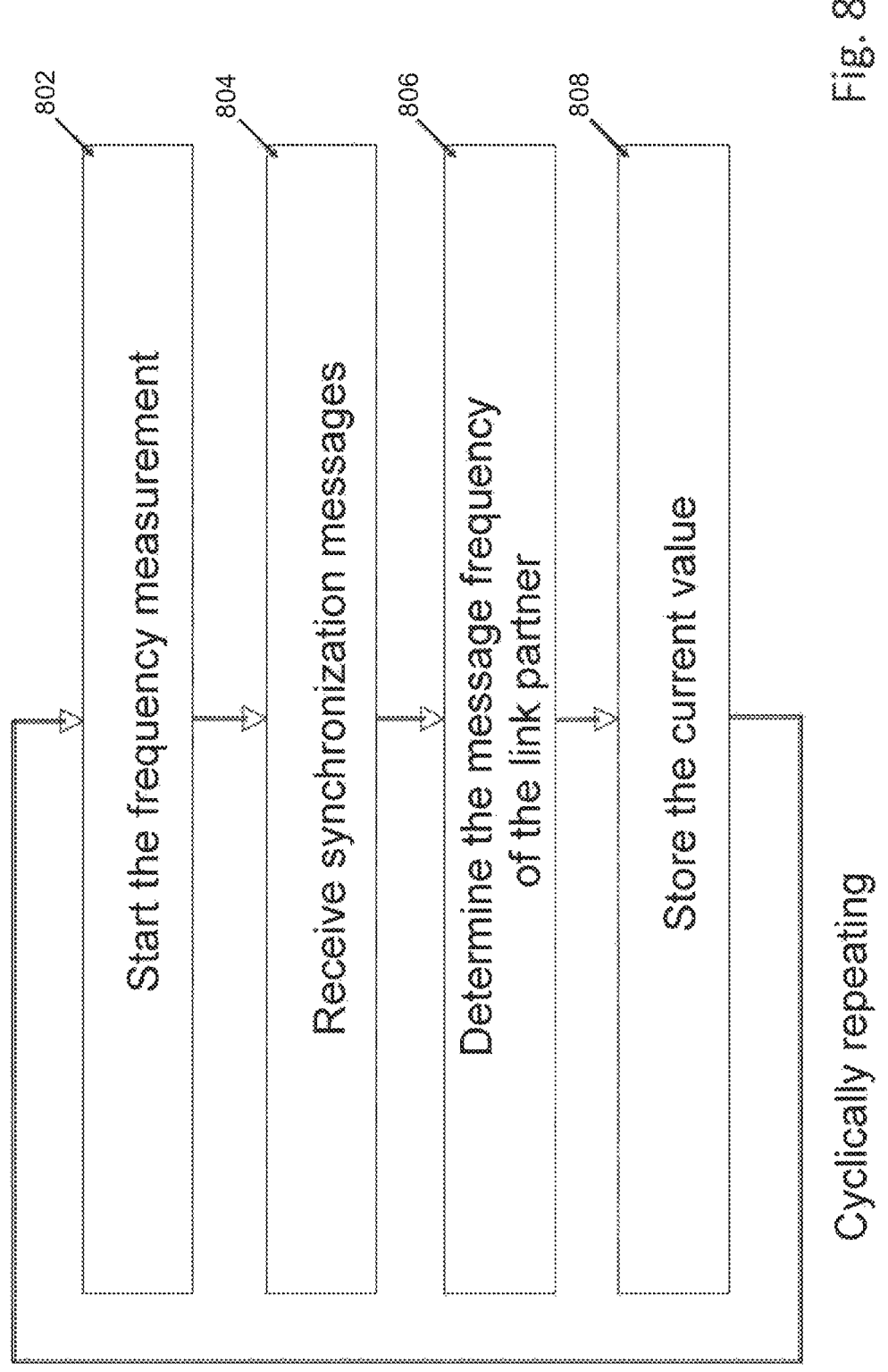
FIG. 8 shows a flowchart for the calculation of the key and for the sending of the messages.

Referring to FIG. 8, Steps 802-808, determining the message frequency of the link partner is illustrated.

Figure 9:
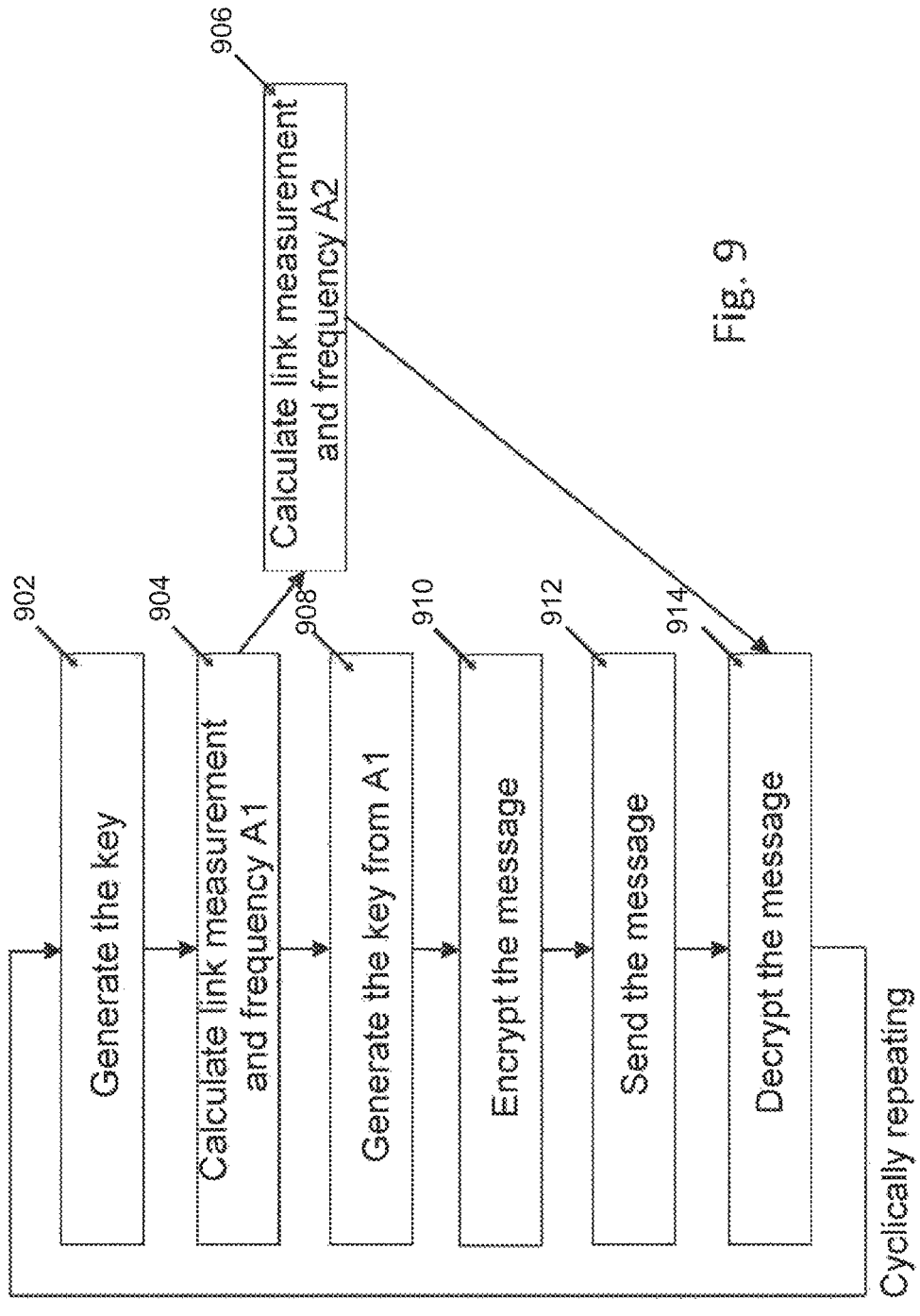
FIG. 9 shows a flowchart for the use of a key over time.

Referring to FIG. 9, Steps 902-914, key generation and calculation of link measurement and frequencies A1 and A2 are illustrated.

It is advantageous to use the current key A1 as long as no new line measurement is carried out. In this way, the link partner always knows which key to use if no new line measurement has been initiated beforehand. A new key should/can be either generated cyclically, e.g. predefined frequency, or started as required, by a trigger or always directly before important messages are sent.

Both the first control unit 3 and the second control unit 4 and also the third control unit 5 can be operated in a normal operating mode or in an energy-saving mode. In the energy-saving mode, the respective control unit consumes less energy than in the normal operating mode. For example, in the energy-saving mode, the speed of a port of the respective control unit can be reduced in comparison with the speed in the normal operating mode. The reduced speed of the port then also affects the respective maximum speed of the respective connecting path.

According to a further exemplary embodiment, a service message 20 can be sent from the first control unit 3 to the third control unit 8. The determination of a delay time 21 of a third signal 22 is then triggered by the service message 20. The third signal 22 is sent between the second control unit 4 and the third control unit 5. According to the exemplary embodiment, the delay time 21 of the third signal 22 is determined by the third control unit 5.

Figure 10:
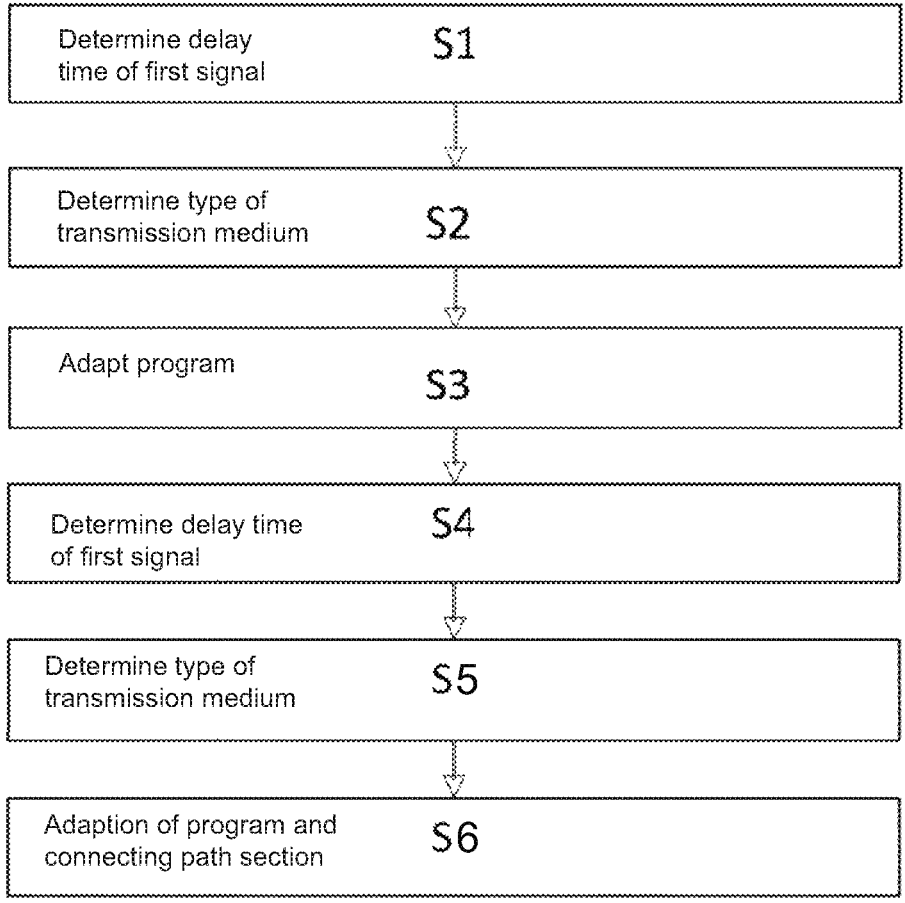
FIG. 10 shows a flowchart for the adaptation of a program in the Ethernet onboard network.
Figure 11:
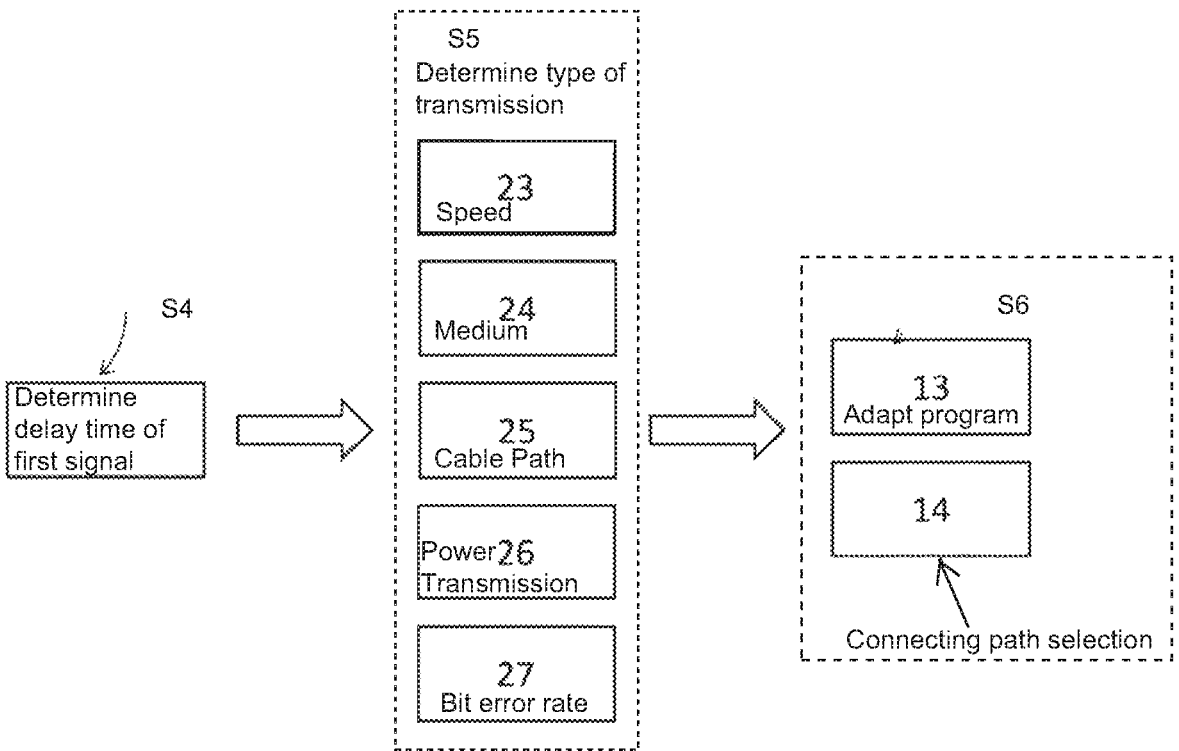
FIG. 11 shows a flowchart for the adaptation of a program in the Ethernet onboard network.

FIGS. 10 and 11 provide a general description of the method for determining the delay time. The delay time 9 of the first signal 10 is determined in a step S1. The type of the transmission medium 12 is determined in a step S2. Finally, the program 13 is adapted in a step S3. The delay time 9 of the first signal 10 is determined in a step S4. As a result, the type of the transmission medium 12 can be determined in a step S5. The type of the transmission medium 12 may in turn comprise the following parameters: speed 23, medium 24, cable length 25, power transmission 26, bit error rate 27. Finally, the adaptation of the program 13 and the connecting path selection 14 then follow in a step S6.

According to this example, it is proposed that the delay time of the signals between connected control units or controllers be measured. Methods of the standard IEEE 1588 or IEEE 802.1AS, for example, can be used to measure the delay times 9, 16 and 21. Methods can also be provided by TTEthernet (time triggered Ethernet), for example, in order to determine the respective delay time 9, 16 and 21.

Figure 12:
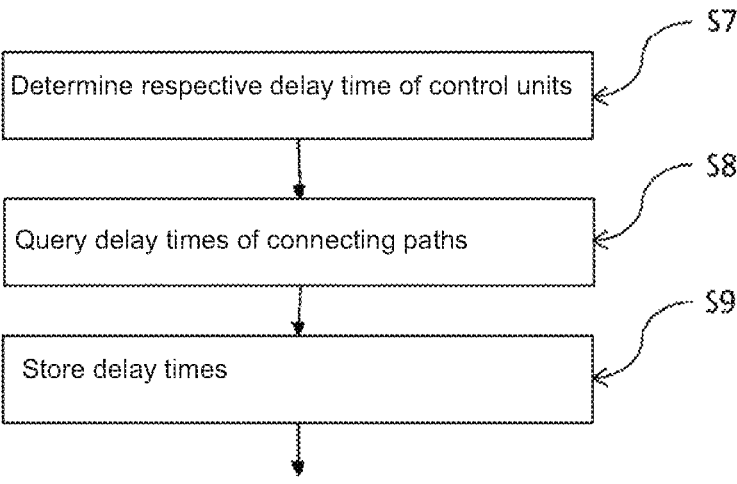
FIG. 12 shows a flowchart for the determination and storage of a delay time of a signal.

FIG. 12 shows the determination of the respective delay time 9, 16 and 21. Local and nonlocal querying of the delay time are described. The program 13, which is executed in particular on at least one control unit, preferably first of all locally determines the local delay time, or the delay times if more than one control unit is directly connected. Other control units are then preferably queried for their delay time to the neighbor by way of a service-oriented method, for example SOME/IP (Scalable Service-Oriented Middleware over IP). This can be implemented either centrally or in a decentralized manner. The querying can either be carried out once, on system startup, definition or after a software update, or can be performed cyclically in order to detect dynamic changes. These data are then stored and assigned the first time, in particular including the addresses of the control units. The respective delay time to the directly connected control units is determined in a step S7. The respective delay times of other connecting paths are queried in a step S8. The respective delay times and the associated connection partners thereof are stored in a step S9.

Figure 13:
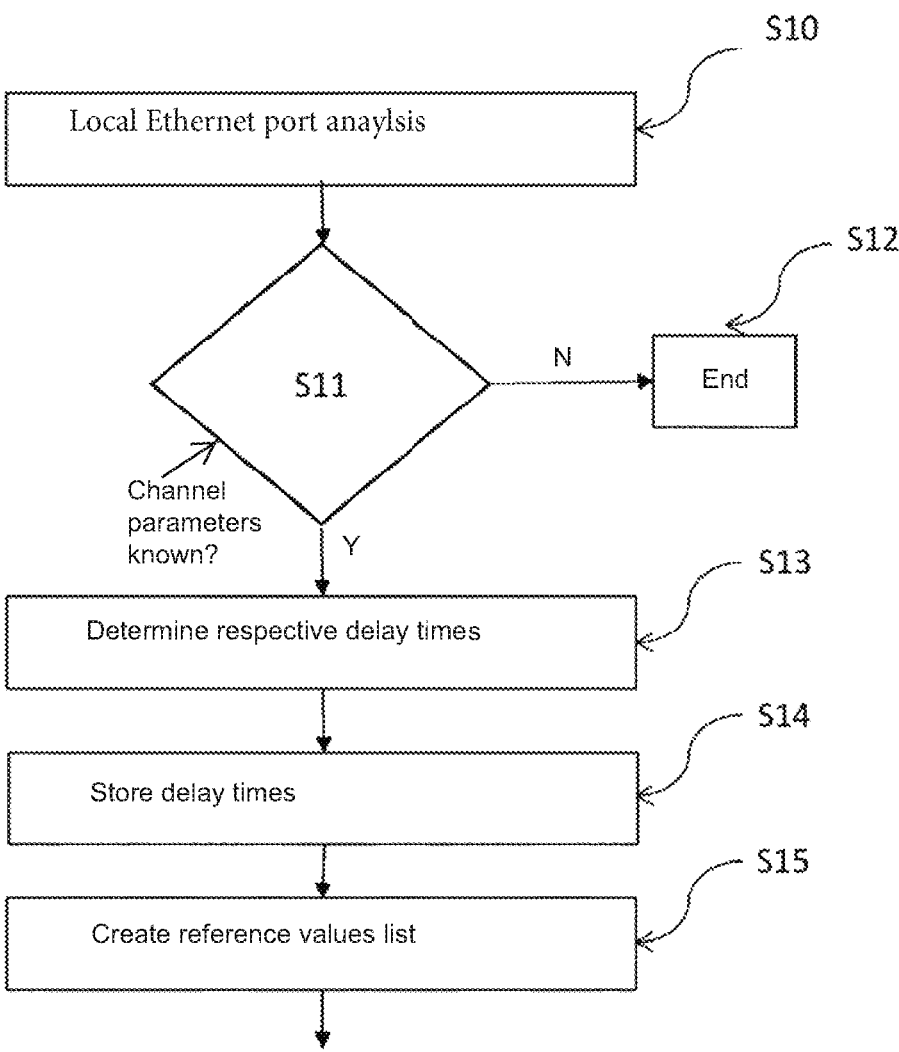
FIG. 13 shows a flowchart for the illustrative adaptation of a program in the Ethernet onboard network.

FIG. 13 shows a further method for deriving the other speeds on the basis of a reference measurement. If, for example, the current temperature is very high or poor cables are used, prestored values may possibly be too inaccurate. It is therefore proposed that the application, or the program 13, itself carries out measurements on its own control unit, in particular in light of its own parameters and other speeds that can then be derived and calculated therefrom. One analysis per local Ethernet port is carried out in a step S10. A test for whether channel parameters are known is performed in a step S11. If this is not the case, a step S12 follows and the method ends. If this is the case, a step S13 follows in which the respective delay time 9, 16 and 21 is determined. The storage takes place in a step S14 and the determined delay time is related to the channel parameters. A list of reference values is created in a step S15.

Figure 14:
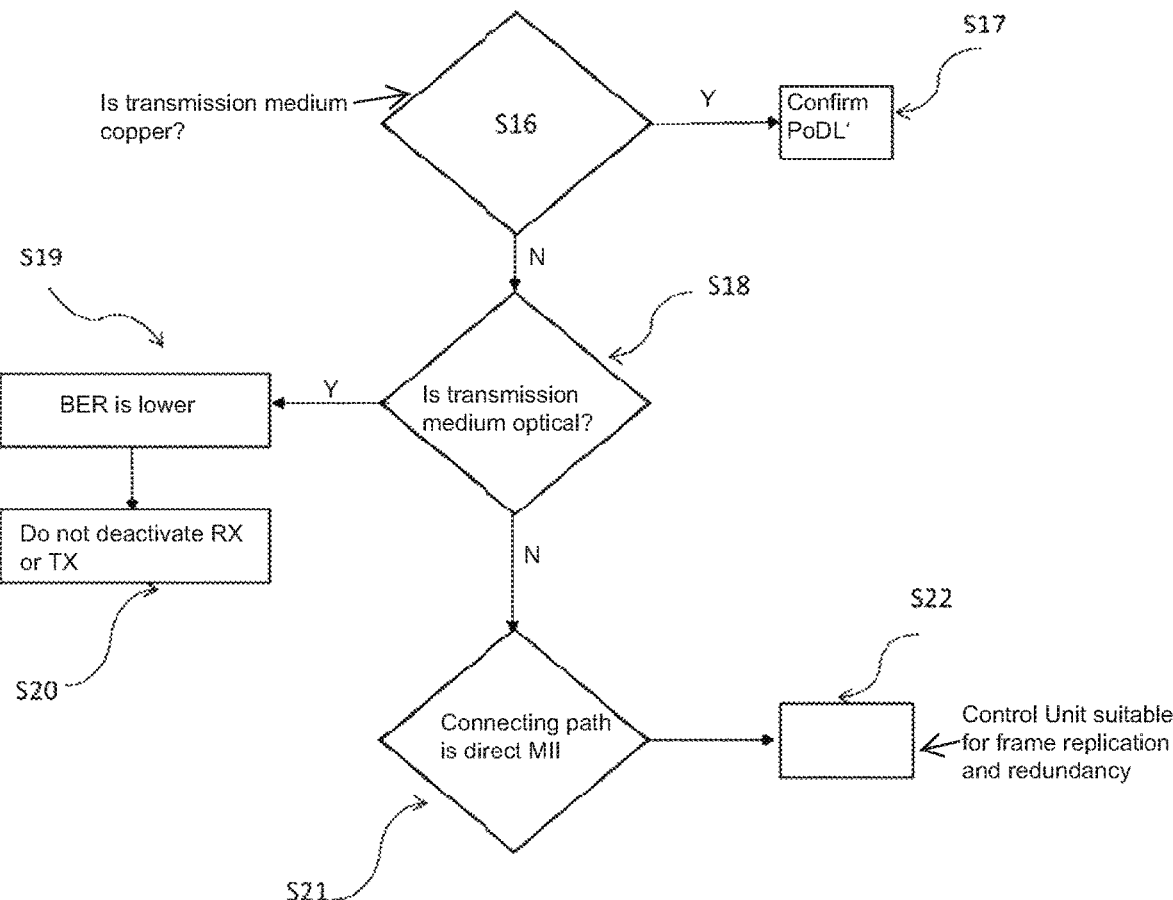
FIG. 14 shows a flowchart for the illustrative adaptation of a program in the Ethernet onboard network.

FIG. 14 shows possible optimization by means of knowledge of the type of the transmission medium 12, 19. A decision is made as to whether the type of the transmission medium 12, 19 is copper in a step S16. If this is the case, a step S17 follows, in which it is confirmed that PoDL (Power over Data Lines), that is to say the supply of power via Ethernet, is possible. If the decision in step S16 is that the medium is not copper, a step S18 follows. A check to ascertain whether the type of the transmission medium 12 is optical is performed in step S18. If this is the case, a step S19 follows. In step S19 it is found that the bit error rate is therefore lower and the reliability of this connecting path is therefore higher. The option of deactivating RX (receiving unit) or TX (transmitting unit) of the control unit 3, 4, 5 if it is not required is provided in a step S20.

If the decision in step S18 is that the medium, or the type, of the transmission medium 12 is not optical, it is assumed in a step S21 that the respective connecting path, as the relevant connecting path, is in the form of a direct MII (Media Independent Interface) connection. In this case, the respective control unit is suitable, for example, for IEEE 802.1CB (Frame Replication and Elimination for Redundancy).

Further options arise from the knowledge of the transmission speed. Combined with the current data streams, data can be deliberately transmitted using a high bandwidth connection, for example, and other connecting paths that are not required can therefore be deactivated, thus making it possible to save energy.

In addition, for high bandwidth connections, there is the option of using redundancy mechanisms (e.g. IEEE 802.1CB). Since the data are continuously transmitted in a redundant manner in this case, a high bandwidth is required for this purpose. It is also conceivable to adapt the application depending on the speed of the transmission path. A camera can adapt the resolution of the image data to be transmitted depending on the speed of the link or connecting path 6, 7, 8, for example.

Figure 16:
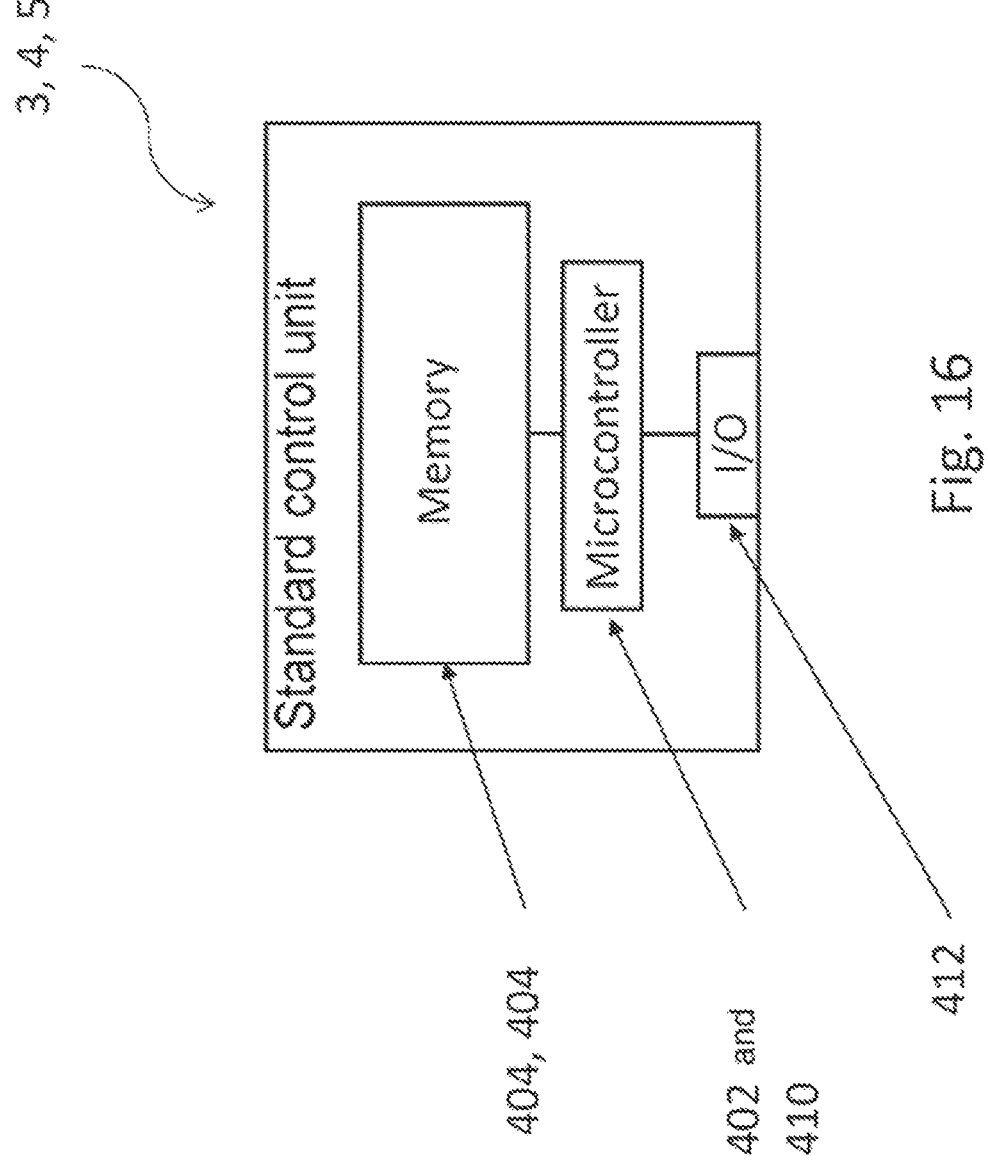
FIG. 16 shows the design of a control unit.
Figure 17:
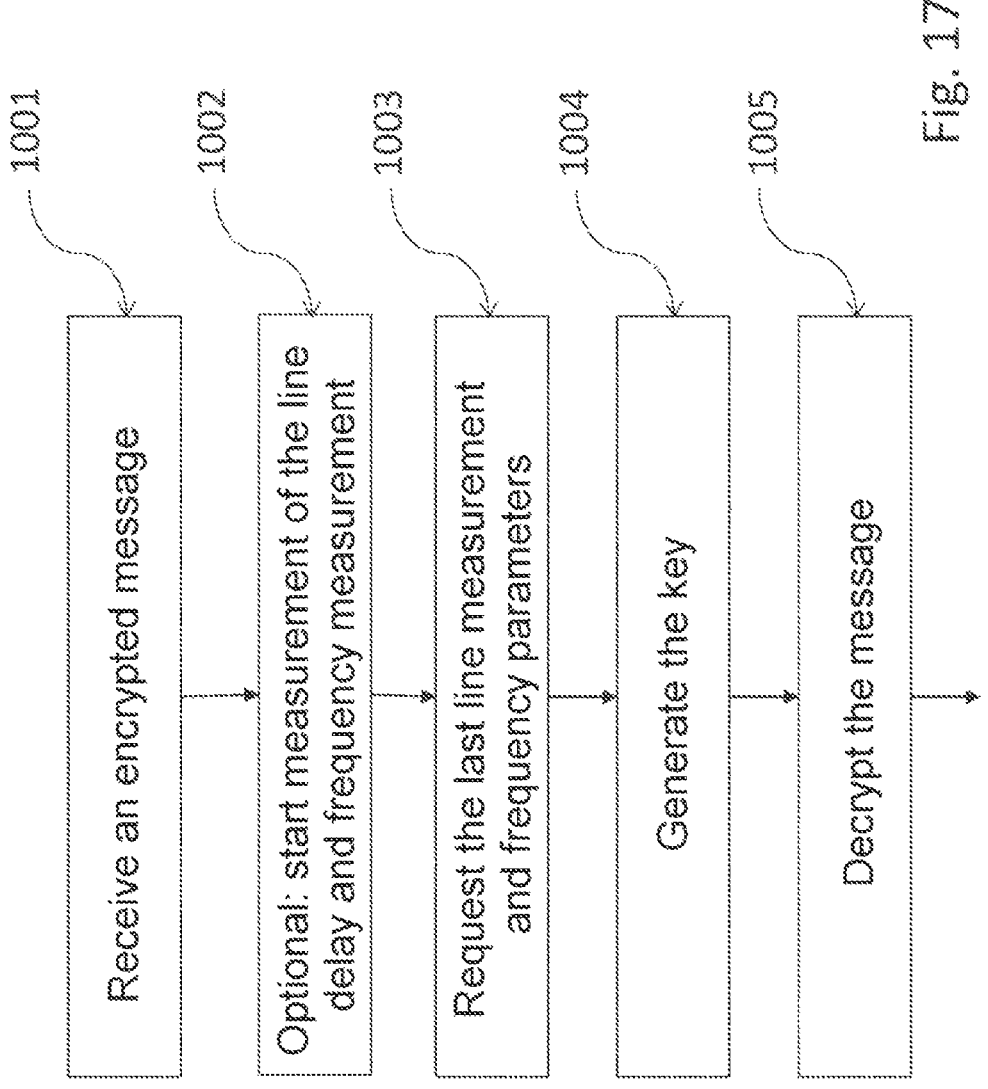
FIG. 17 shows encrypted links with a generated dynamic key from the communication of the control units.

In addition to a microprocessor 402, the control unit 3, 4, 5 in FIG. 16 comprises a volatile and nonvolatile memory 404, 406, two communication interfaces 408 and a synchronizable timer 410. The elements of the network device are communicatively connected to one another by way of one or more data connections or data buses 412. The nonvolatile memory 406 contains program instructions that, when executed by the microprocessor 402, implement at least one embodiment of the method according to the invention and the entropy source is formed in the volatile and/or nonvolatile memory 404, 406, said entropy source then being used to form the dynamic keys 28 for the connecting paths 6. The decoding sequence of the dynamic key during decryption is shown in FIG. 17.

Figure 15:
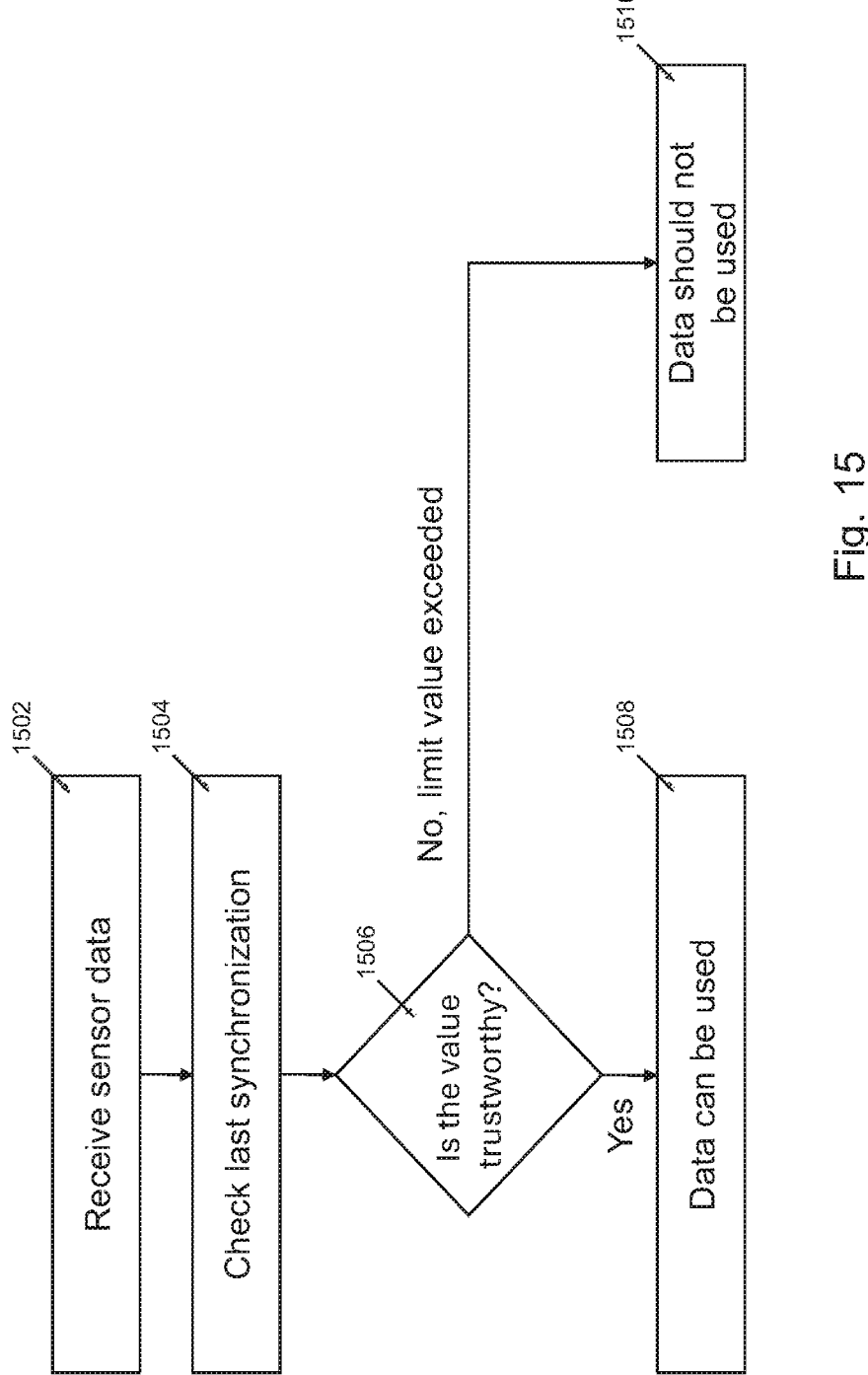
FIG. 15 shows a flowchart for the assessment of the use of received data on the basis of the last successful synchronization time.

FIG. 15 (Steps 1502-1510) shows how the use of received data is assessed on the basis of the last successful synchronization time thereof. This sequence can be used to ascertain whether the checked data that are about to be stored are also suitable for the respective use. This is particularly advantageous if said data are stored on a data recorder. It is of substantial interest to the data recorder whether the content of the data is also correct. In the event of an accident, it is important whether or not the camera detected the pedestrian, for example. If incorrect data are recorded, or data with an incorrect time, the recording is invalid and cannot be detected as such without the method.

Figure 22:
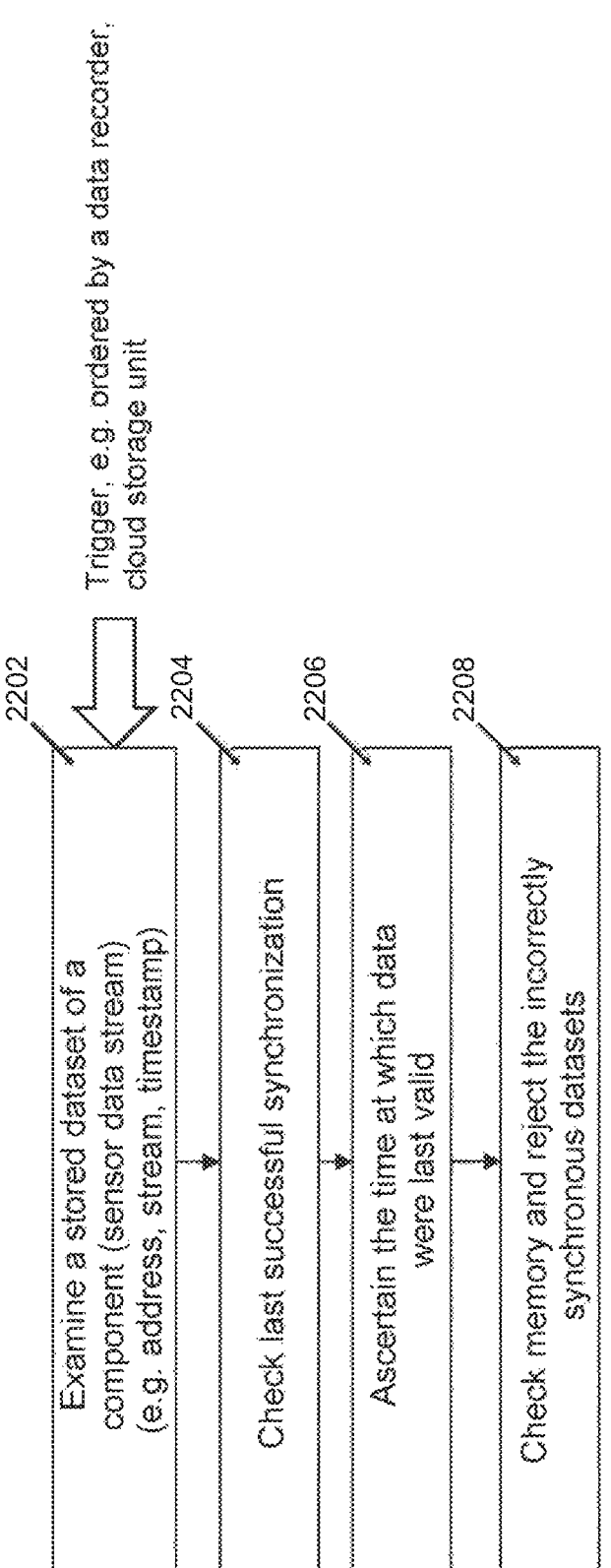
FIG. 22 shows a sequence for the retrospective erasure of data if the synchronization time is above the limit value.

The querying component analyzes a data stream and the sender thereof, as shown in FIG. 22. The method can be taken as a basis for ascertaining when the data were last trusted. The nominal limit values are determined either by the functions, the system manufacturers or the use case as such itself. Said use case may differ per ECU and per use case. Based on this limit value, the data can be categorized as valid, invalid or untrustworthy.

Figure 18:
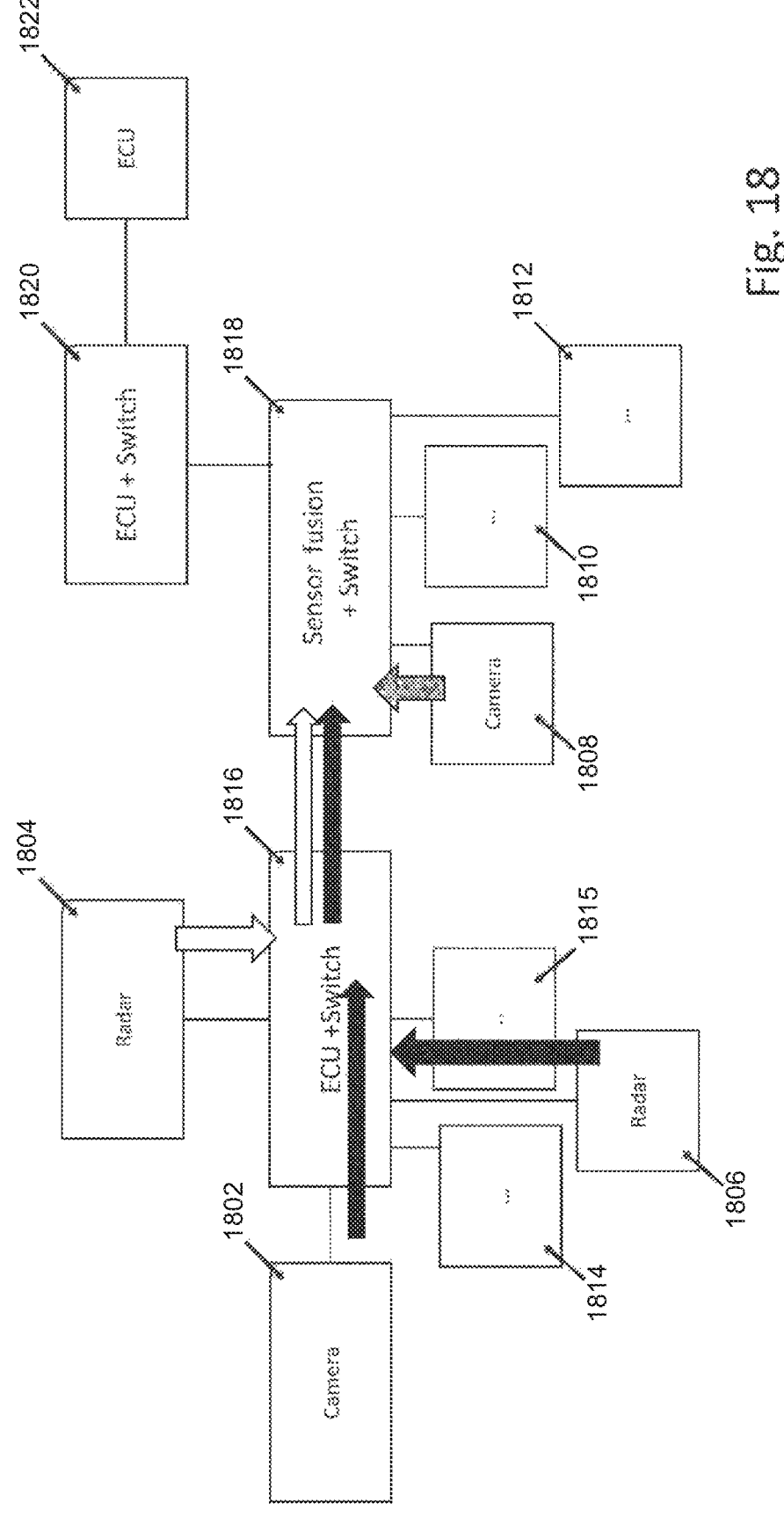
FIG. 18 shows a representation of the use case of a data fusion.
Figure 19:
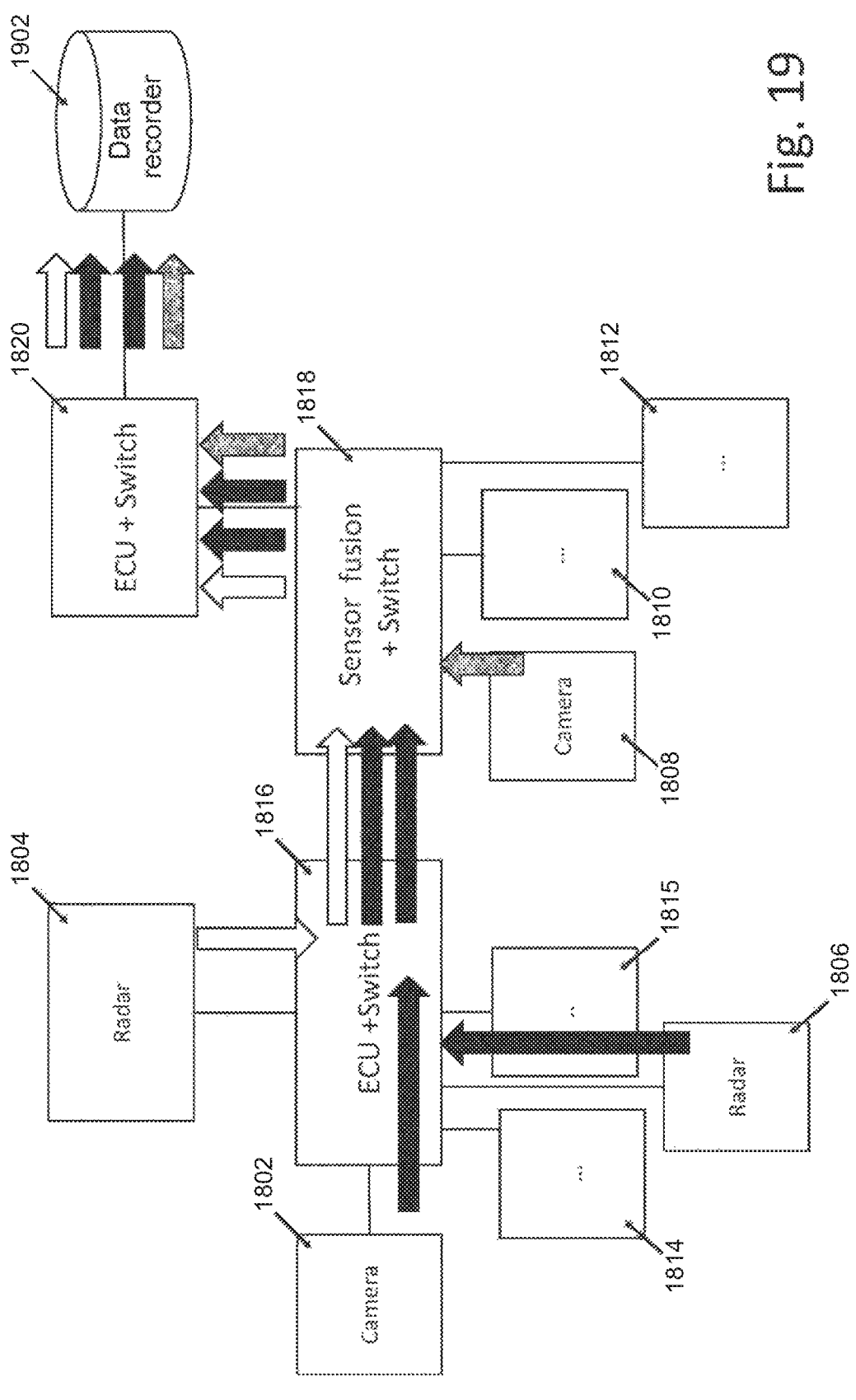
FIG. 19 shows a representation of the use case of a data fusion with a data recorder.

FIG. 18 and FIG. 19 show two use cases in which the time synchronization is of essential importance and the method is used. Firstly, different data from different sensors/control devices (1802-1814, Cameras, radar, etc.) need to be fusioned (1818), and passed on to the ECU+Switch 1820/1822, said data being contained in the sensor message on the basis of the time information, and secondly they can also be stored in data recorder 1902 in order to have evidence in the event of an error.

Figure 20:
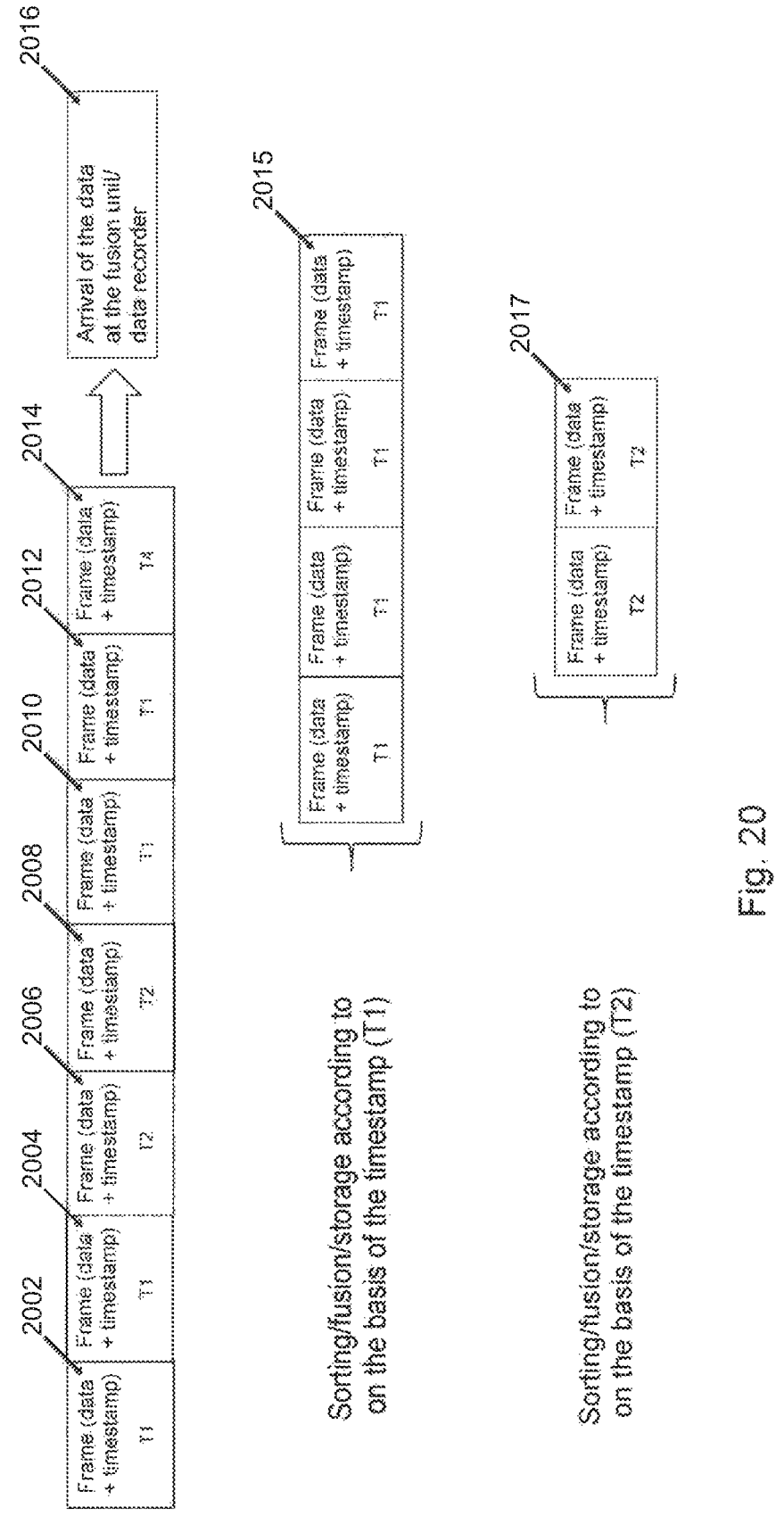
FIG. 20 shows a representation of an assignment of correct data for a data fusion.

FIG. 20 shows that the timestamps 2002-2017 in the data are used as a basis for both fusioning and storing the data so that the correct data can be assigned to a time.

Figure 21:
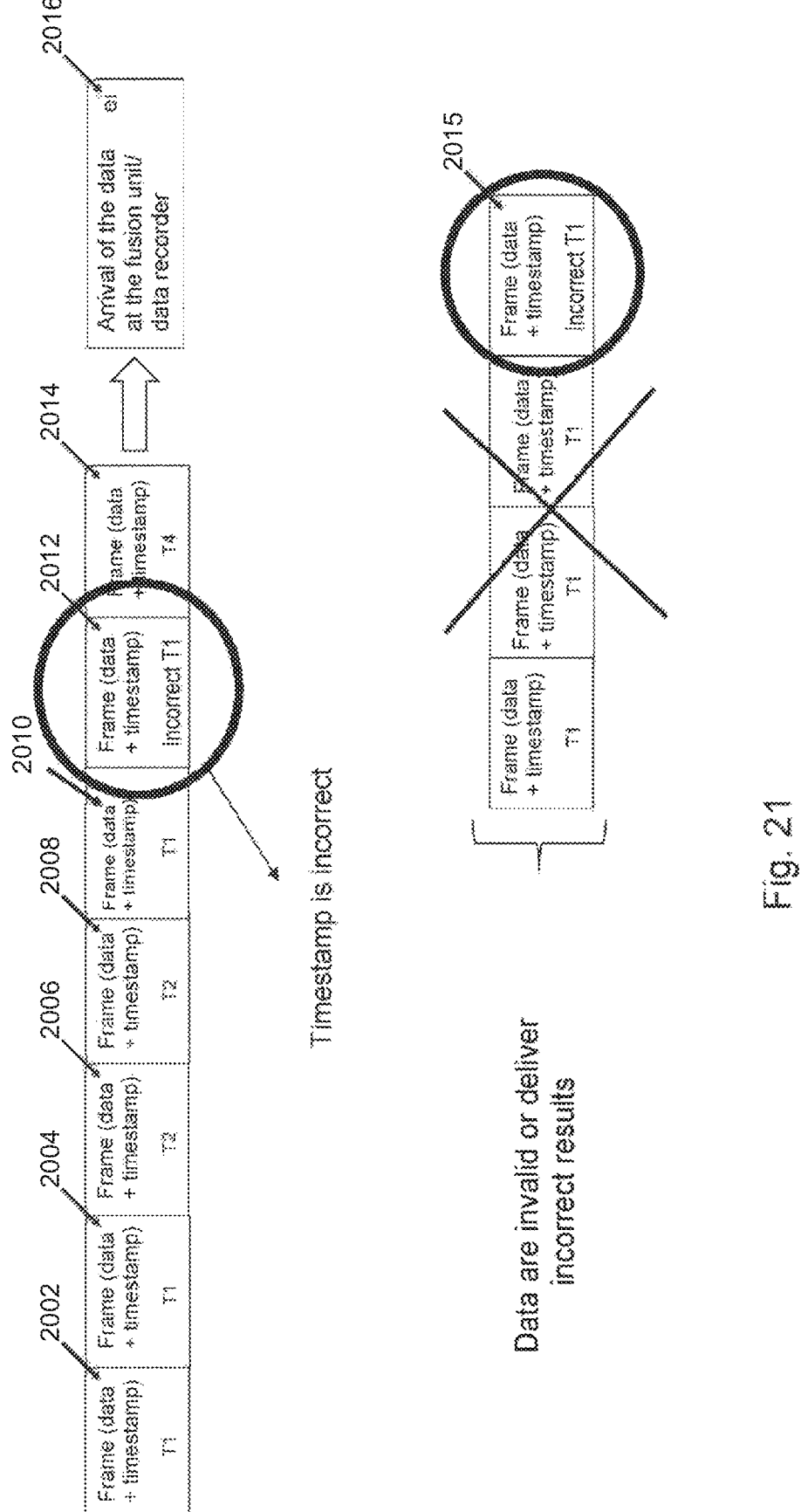
FIG. 21 shows a representation of an erroneous assignment of data for a data fusion.

FIG. 21 shows the arrival of different sensor data frames at a fusion unit or, by way of example, at a data recorder. The latter assigns the data not according to the order in which they arrive, but rather according to their timestamp, which was based on a preceding time synchronization. Since the data in a network have to take paths of different length, sorting is typically based on the creation of these sensor data when they were recorded.

FIG. 21 shows that a timestamp 2012 is incorrect, i.e. that an inconsistency has arisen in the sensor data during the fusion, resulting in the time synchronization being erroneous, and wherein the method proposed here was not used. The method improves the precision and accuracy of the clock synchronization for the realtime capability of the Ethernet onboard network. A measure of the quality of a synchronization protocol is above all its achievable synchronization accuracy, which can be derived from the method as additional information.

FIG. 22 (Steps 2202-2208) shows the sequence for how retrospective erasure of data takes place if the synchronization time is above the limit value. The method is also used if data have already been stored (or are just about to be stored), for example, as in the data recorder use case. It is of substantial interest to the data recorder whether the content of the data is also correct—in the event of an accident, it is important whether or not the camera detected the pedestrian, for example. If incorrect data are recorded, or data with an incorrect time, the recording is invalid. The querying component analyzes a data stream and the sender thereof as indicated in FIG. 22. The method can be taken as a basis for ascertaining when the data were last trusted. The nominal limit values are determined either by the functions, the system manufacturers or the use case as such itself. Said use case may differ per ECU and per use case. Based on this limit value, the data can be categorized as valid, invalid or untrustworthy.

The querying component may be a data recorder, a cloud storage unit, that wants to check an order to examine a stored dataset of a component, such as a sensor data stream. This can be accomplished by checking the address, stream or timestamp, for example. For this purpose, a successful synchronization is checked for the last time, and the time at which data were last valid is ascertained. The memory is checked, and incorrectly synchronous datasets are rejected.

FIG. 1.1 shows known designs of oscillators. The oscillating crystals used in crystal oscillator circuits, as illustrated in FIG. 1A, are usually crystal laminae, rods or forks (such as a tuning fork), which, by way of electrical voltage, can be caused to undergo mechanical shape changes, which in turn generate an electrical voltage. The reaction is given by the mechanical oscillation modes of the piezoelectric crystal.

An oscillating crystal under an AC voltage having a specific frequency, its resonant frequency, is excited to effect particularly strong resonant oscillations (piezoelectric sound generators also have this property). Given a suitable crystal cut, it is almost independent of ambient influences such as temperature or amplitude and is therefore used as a precise clock generator having a long-term stability of better than 0.0001%.

Oscillating crystal plates have two electrically distinguishable electrical/mechanical modes:

In the case of series resonance, their apparent resistance to the AC current is particularly low and they behave like a series circuit formed by a coil and a capacitor.

In the case of parallel resonance, the apparent resistance is particularly high. They then behave like a parallel circuit formed by capacitor and coil with the special feature that no DC current can flow (quartz is a very good insulator).

The parallel resonance is approximately 0.1% higher than the series resonance. A comparable oscillatory behavior is also found at three times, five times, etc. the fundamental frequency. A crystal having a resonant frequency of 9 MHz can thus also be made to oscillate at 27 MHz or at 45 MHz. Harmonic crystals specifically suitable therefor have a corresponding suspension in order not to impede these harmonic oscillations.

The operating point of the oscillating crystal in the crystal oscillator lies between the natural resonances mentioned above. In this frequency range, the oscillating crystal behaves inductively like a coil. Together with its nominal capacitive load, the crystal oscillator oscillates at its nominal load resonant frequency. Slight deviations from the nominal frequency can be generated or compensated for by way of a change/deviation from the nominal load capacitance.

The frequency is slightly temperature-dependent, as already mentioned. For greater demands in respect of the temperature response, there are temperature compensated oscillators (TCXO-Temperature Compensated Crystal Oscillator). This usually involves the use of thermistors that generate a control voltage to counteract the temperature-dependent change in frequency of the crystal, as illustrated in FIG. 1.1B. The voltage thus generated is usually applied to a variable-capacitance diode, such that the capacitance that is changed as a result corrects the frequency of the crystal oscillator.

If an even higher accuracy is required, a crystal oven is used, as illustrated in FIG. 1.1C. In this case, the crystal is incorporated in a temperature-regulated housing in order to minimize influences dependent on the ambient temperature. The crystal therein is electrically heated to 70° C., for example. This design is called OCXO (Oven Controlled Crystal Oscillator). The "X" stands in each case for Xtal, the shortened form of Crystal.

FIG. 2.1 shows the frequency-temperature characteristic of various crystal types. At crystals are used for Ethernet in the automotive field.

As already explained, the frequency is slightly temperature-dependent. The invention makes use of this property of the crystals in order to derive the temperature change therefrom. As illustrated in FIG. 3.1, temperature changes directly affect the crystal and thus the uncontrolled PLL of the Ethernet transceiver. This in turn affects the generation of the clock signals for sending the cyclic PTP messages. In the automotive field, AT-cut crystals are always used for Ethernet since they have a very good temperature stability. Moreover, the temperature influence always has predictable effects.

FIG. 3.1 illustrates the system model of the time synchronization of Ethernet, and what effects the temperature changes have on the crystal and thus on the uncontrolled PLL of the Ethernet transceiver. This in turn affects the generation of the clock signals for sending the cyclic PTP messages. In vehicle engineering, AT-cut crystals are always used for Ethernet since they have a very good temperature stability. Moreover, the temperature influence always has predictable effects.

In FIGS. 4.1-5.1B (Steps 4100-4106, 5102-5106), the proposed method is explained and begins with the start of the delay time measurement (Step 4100). In this case, a PDelay_Request message is sent to the ECU via the network. Said ECU replies with a PDelay_Response and a PDelay_Response_FollowUP message. These messages and the arrival time thereof (hardware timestamp) are used to calculate the NRR—i.e. the frequency offset with respect to the own clock (Step 4102), that is to say that the frequency offset between the two clock generators can be measured here.

The delay time measurement (measurement of the delay between nodes (cable+PHY)) additionally enables the Neighbor Rate Ratio to be ascertained. The NRR measures the frequency offset between two clocks (crystals of two PHYs or ECUs). By way of example, the magnitude of the difference in ppm is thus ascertained. This is possible since Ethernet uses hardware timestamps instead of software timestamps.

NRR=1 would mean that both crystals/PLLs are running at exactly the same speed (owing to manufacturing tolerances, . . . virtually impossible). NRR=0.99998 would mean that the crystal is running more slowly by 20 ppm.

The method continuously determines the clock rate (Step 4104) of the crystal by way of measurements of the delay time between the components (this also functions within an ECU by way of the PCB). These data are logged and compared with values already recorded. If the deviation changes (always taking account of the own local clock/clock generator), then it is possible for the first time to ascertain whether a temperature increase or decrease is the basis (Step 4106). (Aging also affects the clock generator, but takes effect very slowly and has no influence at all on measurements that are made successively.)

If a reference measurement is present, that is to say if how fast or slow the clock timing is with respect to a given temperature can be determined or assigned, then the temperature can also be derived directly. On the basis of this temperature, the reaction can be e.g. an error (feedback, error code . . . ) or else adaptation of the synchronization.

Referring to FIG. 6.1, at Step 6102 the NRR is monitored. At Step 6104 delay time measurements are carried out. At Step 6106, the NRR is logged. At Step 6108, the newly recorded NRR are compared with the stored values. At Step 6110/6112, it is determined if the NRR greater than the last value. If the NRR is not greater than the last value, at Step 6114, it is determined if the NRR is less than the last value. At Step 6120, it is determined if the NRR less than the last value by a factor of x. At Step 6122, the temperature decrease is calculated. If at Step 6112 the NRR is determined to be greater than the last value, Step 6114 determines if the NRR greater than the last value by a factor of x. At Step 6116, the temperature increase is calculated. As a result, abrupt increases can thereby be detected.

Example: According to FIG. 2.1, a clock that is slower by 20 ppm, if the measurement partner is at room temperature, would operate at a current ambient temperature of approximately 60 degrees.

The component that would like to know the temperature may be a network manager of a central ECU that is seeking to relocate software or is seeking free resources, for example. On the basis of the acquired temperature (temperature change), the unit can decide to transfer software or else to shift software to there.

On the basis of the available resources of the server components, the method can be used to relocate software to the components which are not on the verge of collapse.

The method described enables functions and applications to be (dynamically) transferred to other control units/processors, i.e. also in order to optimize them. This is referred to as live migration, reallocation or migration.

By virtue of the approach described here, now for the first time there are possibilities for implementing software on different ECUs as well, since the hardware is becoming more generalized and the software less dependent on the platform. Therefore, what software will run on what control unit (server) is not always definite at the time when the system is designed.

As explained in FIG. 7.1 (Steps 7102-7108), the component that would like to know the temperature may be a network manager of a central ECU that is seeking to relocate software or is seeking free resources, for example. On the basis of the acquired temperature (temperature change), which can be determined by way of the network, the unit can decide to transfer software or else to shift software to there.

On the basis of the available resources of the server components, the method can be used to relocate software to the components which are not on the verge of collapse, as a result of which a higher overall stability of the overall network is achieved.

FIG. 8.1 (Steps 8102-8108) shows the use of the method in the decision for the relocation of software/resources. The address of the grandmaster is contained in the synchronization messages.

LIST OF REFERENCE SIGNS

1 Motor vehicle
2 Ethernet onboard network
3 First control unit
4 Second control unit
5 Third control unit
6 First connecting path
7 Second connecting path
8 Third connecting path
9 Delay time of the first signal
10 First signal
11 Maximum speed of the first connecting path
12 Type of the transmission medium of the first connecting path
13 Program
14 Connecting path selection
15 Transmission security value
16 Delay time of the second signal
17 Second signal
18 Maximum speed of the second connecting path
19 Type of the transmission medium of the second connecting path
20 Service message
21 Delay time of the third signal
22 Third signal
23 Speed
24 Medium
25 Cable length
26 Power transmission
27 Bit error rate
28 Dynamic key
29 Time synchronization message
200 Entropy source
211 Sending at time t1
212 Reception at time t4
213 Reception at time t4
221 Reception at time t2
222 Sending at time t3
223 Delayed sending at time t3
300 Encrypted message at time t5
400 Control unit
402 Microprocessor
404 RAM
406 ROM
408 Communication interface
410 Timer
412 Bus/communication interface
1001 Receive an encrypted message
1002 Start measurement of the line delay and frequency measurement
1003 Request the last line measurement and frequency parameters
1004 Generate the key
1005 Decrypt the message

The invention claimed is:

1. A method for ascertaining a temperature of a control unit in a motor vehicle by means of Ethernet, the method comprising:

determining a delay time of a first signal on a first connecting path between a first server ECU of the Ethernet onboard network and a second server ECU of the Ethernet onboard network;

determining a maximum speed of the first connecting path on the basis of the delay time; and identifying at least the first server ECU of the Ethernet onboard network;

synchronizing at least the first server ECU of the Ethernet onboard network;

ascertaining a synchronization interval;

ascertaining a timestamp of the first server ECU;

reading a timestamp or querying a time of the first server ECU;

comparing the timestamp with a reference clock of the Ethernet onboard network;

carrying out a delay time measurement;

ascertaining a speed of the associated clock generator;

ascertaining a time difference of the synchronization interval;

ascertaining a last synchronization;

reference measurement of a clock rate of a clock generator of the first server ECU with respect to a clock rate of a clock generator of the second server ECU;

monitoring the clock rate of the clock generator of the first server ECU and the clock rate of the clock generator of the second server ECU;

ascertaining a first server ECU temperature and a second server ECU temperature;

ascertaining an ECU temperature change of the first server ECU and/or the second server ECU by evaluating the reference measurement, by way of determining at what frequency of the clock generators the ascertained server ECU temperatures are present.

2. The method as claimed in claim 1, wherein the reference measurement of a clock rate of the first server ECU and the second server ECU are ascertained by means of the IEEE 802.1AS protocol.

3. The method as claimed in claim 1, wherein the speed of the clock generator is ascertained by the PTP NRR (Neighbor Rate Ratio) method.

4. The method as claimed in claim 1, wherein the following steps are carried out:

the NRR is continuously ascertained and/or monitored, the delay time measurement is carried out, the NRR is logged, the newly recorded NRR is compared with the stored values, wherein a check is made to establish whether the NRR is greater than the last value and, if a greater value of the NRR is present, the factor by which the NRR is greater than the last value of the NRR is checked and then the temperature increase is calculated and, if an NRR value that is less than the last value is present, then a temperature decrease is calculated.

5. The method as claimed in claim 1, wherein the type of the transmission medium and the ascertainment of the synchronization interval ascertainment of a drift of a timer of the first control unit ascertainment of a timestamp of the first control unit ascertainment of the speed of the associated clock generator ascertainment of the time difference of the synchronization interval ascertainment of the last synchronization are communicated to a program in the Ethernet onboard network and a connecting path selection of the program is adapted on the basis of the type of the transmission medium.

6. The method as claimed in claim 1, wherein the type of the transmission medium and the ascertainment of the synchronization interval, ascertainment of a drift of a timer of the first control unit, ascertainment of a timestamp of the first control unit, ascertainment of the speed of the associated clock generator, ascertainment of the time difference of the synchronization interval, ascertainment of the last synchronization, are communicated to a program in the Ethernet onboard network and a connecting path selection of the program is adapted on the basis of the type of the transmission medium.

7. The method as claimed in claim 1, wherein the type of the transmission medium is determined as optical, copper or wireless.

8. The method as claimed in claim 1, wherein a transmission security value, which describes a probability of loss of data transmitted by way of the first connecting path, is assigned to the first connecting path (6) on the basis of the type of the transmission medium.

9. The method as claimed in claim 1, wherein delay times of a plurality of signals on the first connecting path are determined and the fastest delay time of the plurality of signals is selected, the maximum speed of the first connecting path being determined on the basis of the fastest delay time.

10. The method as claimed in claim 1, wherein a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

11. The method as claimed in claim 1, wherein the method is performed after the first control unit changes from a normal operating mode to an energy-saving mode and/or from the energy-saving mode to the normal operating mode.

12. The method as claimed in claim 1, wherein the delay time of the first signal is determined using the first control unit and a delay time of a third signal on a third connecting path, which is connected to the first control unit only indirectly, between the second control unit and a third control unit of the Ethernet onboard network is determined using the third control unit, the determination of the delay time of the third signal being triggered by a service message sent from the first control unit to the third control unit.

13. An Ethernet onboard network for a motor vehicle, having a first control unit and a second control unit, wherein the control units are connected to one another by way of at least one connecting path, and the first control unit is in a form as claimed in claim 12.

14. A control unit for an Ethernet onboard network, which, as a first control unit, is designed:

to send a signal to a second control unit of the Ethernet onboard network and to receive the signal from the second control unit;

to determine a delay time of the signal on a connecting path to the second control unit;

to determine a maximum speed of the connecting path on the basis of the delay time; and to determine a type of a transmission medium of the connecting path on the basis of the maximum speed, and at least includes a microprocessor, a volatile memory and nonvolatile memory, at least two communication interfaces, a synchronizable timer, the nonvolatile memory containing program instructions that, when executed by the microprocessor, wherein at least the method as claimed in claim 1 is implementable and executable.

15. The Ethernet onboard network as claimed in claim 14, wherein the Ethernet onboard network comprises a third control unit, which is connected to the first control unit only indirectly and is connected to the second control unit directly by way of a third connecting path, wherein the third control unit is designed to determine a delay time of a third signal on the third connecting path, wherein the first control unit is designed to trigger the determination of the delay time of the third signal by way of a service message to the third control unit.

16. A vehicle having multiple control units as claimed in claim 14, comprising an Ethernet onboard network.

17. A non-transitory computer program product comprising instructions that, when the program is executed by a computer, cause said computer to perform the method as claimed in claim 1.

18. A non-transitory computer-readable medium on which the computer program product as claimed in claim 17 is stored.

* * * * *